(12) United States Patent
Yao

(10) Patent No.: US 9,197,418 B2
(45) Date of Patent: Nov. 24, 2015

(54) COMMUNICATION SYSTEM FOR AUTHENTICATING MESSAGES WITH UNIQUELY SPECIFIED GENUINE INFORMATION

(75) Inventor: Taketsugu Yao, Osaka (JP)

(73) Assignee: Oki Electric Industry Co., Ltd., Tokyo (JP)

(*) Notice: Subject to any disclaimer, the term of this patent is extended or adjusted under 35 U.S.C. 154(b) by 590 days.

(21) Appl. No.: 13/234,167

(22) Filed: Sep. 16, 2011

(65) Prior Publication Data

US 2012/0089842 A1    Apr. 12, 2012

(30) Foreign Application Priority Data

Oct. 8, 2010  (JP) ................. 2010-228396

(51) Int. Cl.
*H04L 9/32*      (2006.01)
*H04L 9/08*      (2006.01)

(52) U.S. Cl.
CPC .............. *H04L 9/3242* (2013.01); *H04L 9/083* (2013.01); *H04L 9/3263* (2013.01); *H04L 2209/38* (2013.01); *H04L 2209/805* (2013.01)

(58) Field of Classification Search
CPC .......................... H04L 9/3294; H04L 9/3243
See application file for complete search history.

(56) References Cited

U.S. PATENT DOCUMENTS

2006/0059224 A1* 3/2006 Yao ................................ 709/201
2006/0282675 A1* 12/2006 Yao ................................ 713/176
2008/0133921 A1* 6/2008 Yao ................................ 713/175

FOREIGN PATENT DOCUMENTS

JP        10-032573 A    2/1998
JP       2003-069581 A    3/2003
JP       2006-157856 A    6/2006

OTHER PUBLICATIONS

Taketsugu Yao, Shigeru Fukunaga, and Toshihisa Nakai, Reliable Broadcast Message authentication in Wireless Sensor Networks, EUC Workshops 2006, LNCS 4097, pp. 271-280.*
Kui Ren et al.,"Multi-user Broadcast Authentication in Wireless Sensor Networks," 2007, IEEE, pp. 223-232.*
Laura Gheorghe et al.,"Reliable Authentication and Anti-replay Security Protocol for Wireless Sensor Networks," ISBN: 978-1-61208-105-2, pp. 208-214.*
Adrian Perrig et al., "Secure Broadcast Communication in Wired and Wireless Networks", Kluwer Academic Publishers, (2003), pp. 161-165.

* cited by examiner

*Primary Examiner* — Luu Pham
*Assistant Examiner* — Canh Le
(74) *Attorney, Agent, or Firm* — Rabin & Berdo, P.C.

(57) ABSTRACT

In a sensor network system, a transmitter device uses a message authentication key generated by a message generator to transmit a message with authenticator to plural receiver devices, which in reply produce a certification by a certification generator from a message with authenticator held by a message holder to transmit the certification to the transmitter device. An information generator of the transmitter device uses an identification from a reception checker and the message authentication key thus generated to generate an authentication key notification, which will be transmitted to receiver devices having transmitted the certification. In the receiver devices, the message holder holds the authentication key notification, from which an authentication key acquirer acquires the message authentication key, which a message authenticator uses to compare the message with authenticator generated with the message with authenticator held in the message holder to confirm the received message.

13 Claims, 20 Drawing Sheets

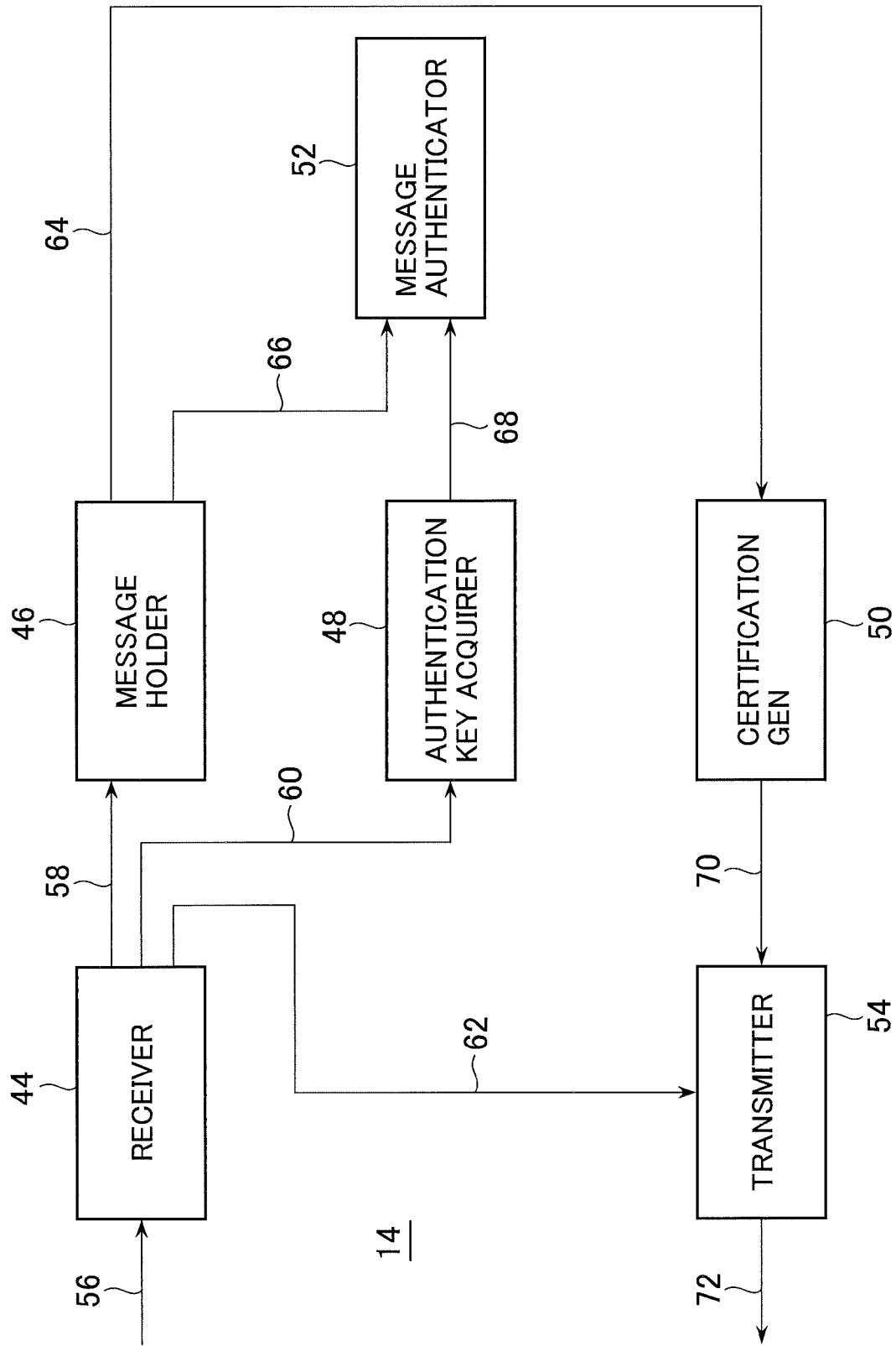

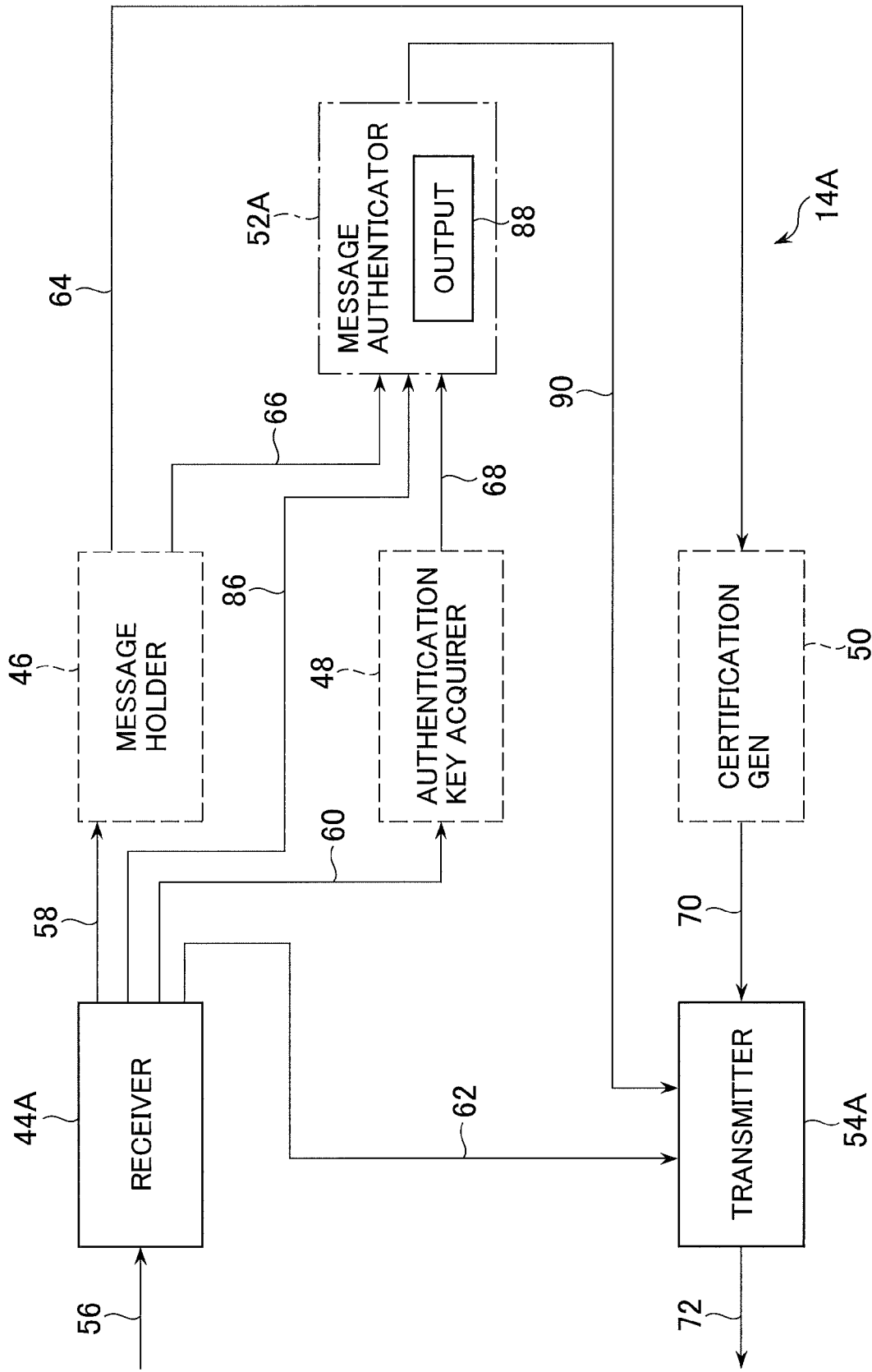

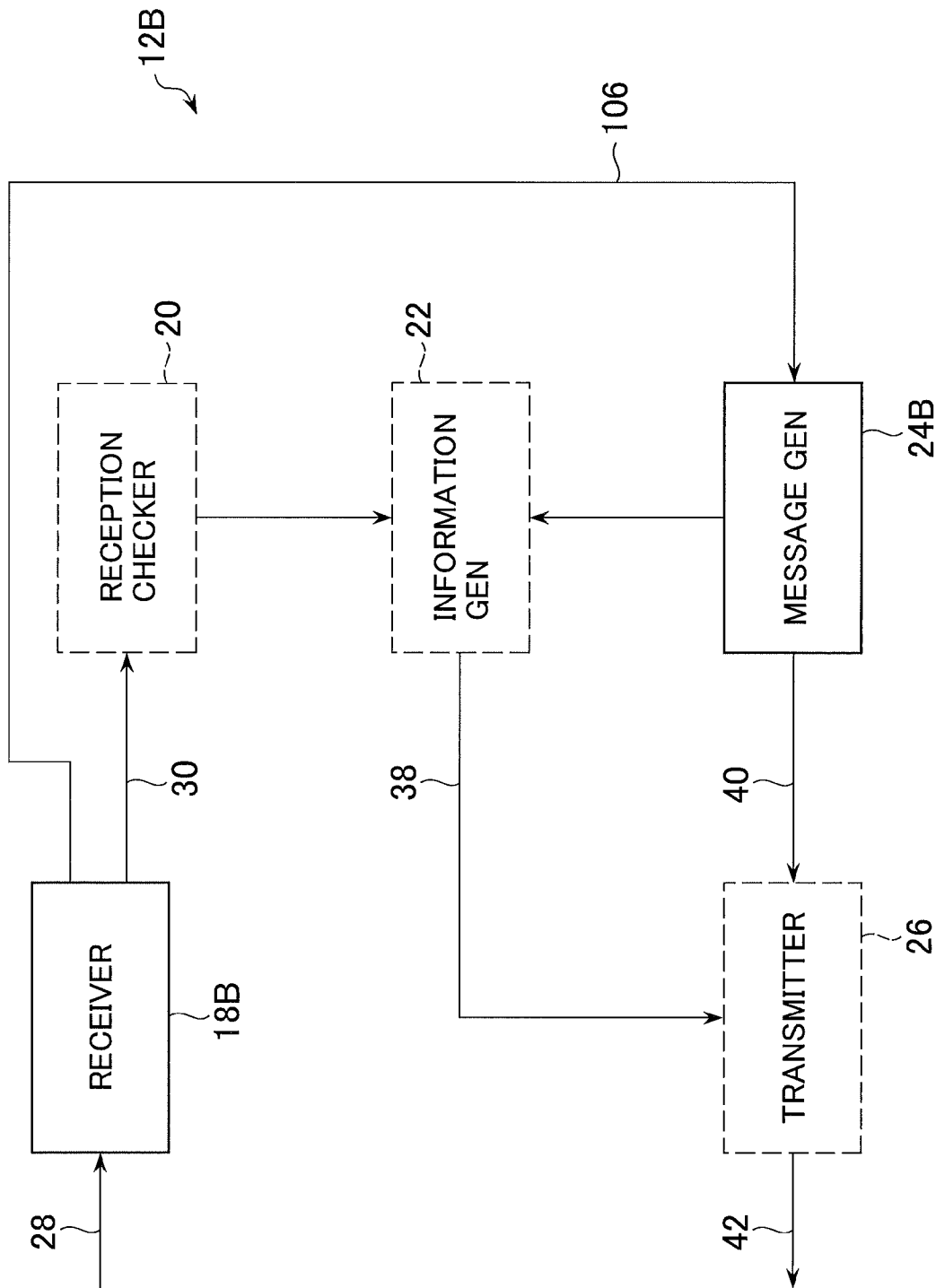

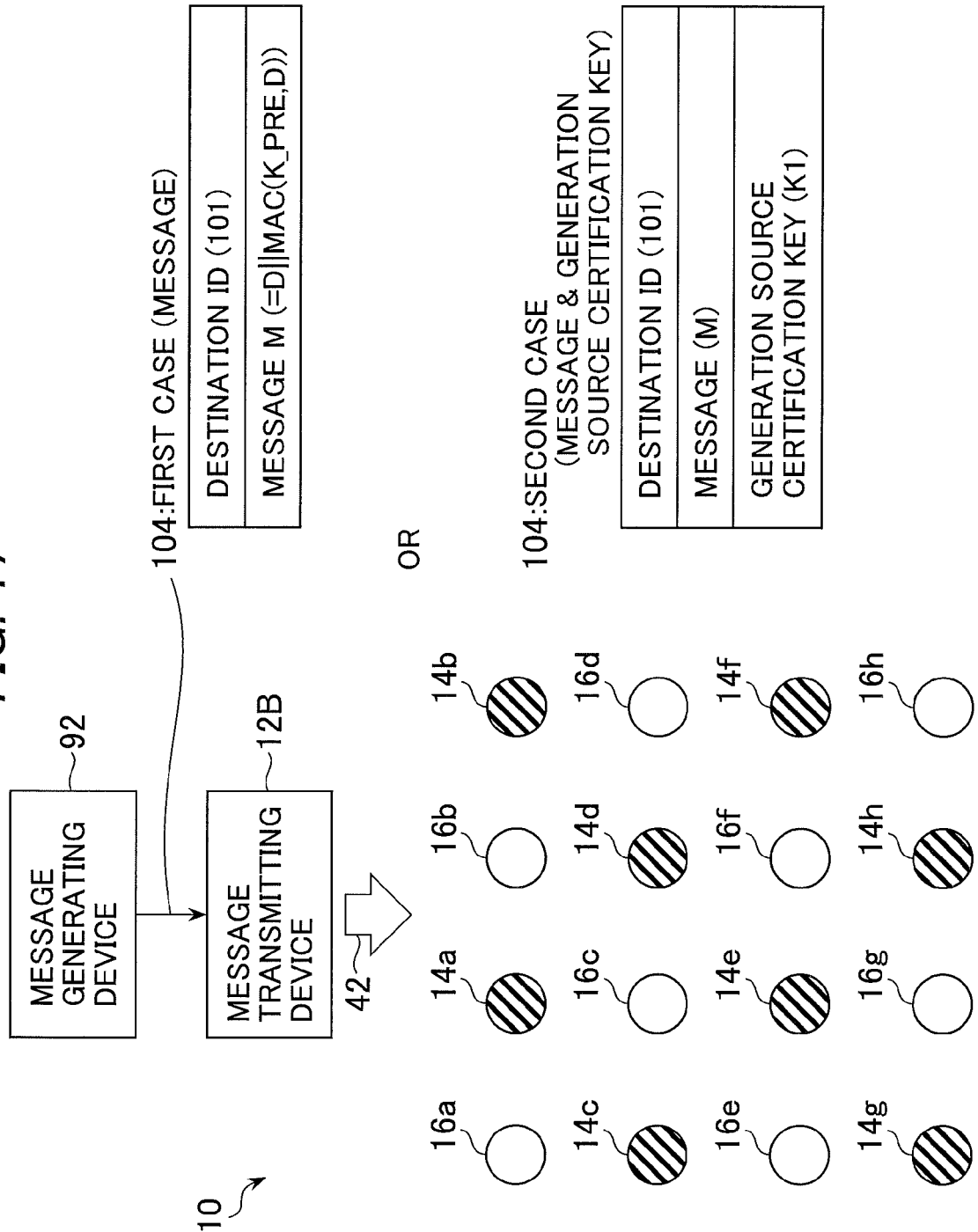

COMMUNICATION SYSTEM FOR AUTHENTICATING MESSAGES WITH UNIQUELY SPECIFIED GENUINE INFORMATION

BACKGROUND OF THE INVENTION

1. Field of the Invention

The present invention relates to a communication system, and more particularly to a communication system applicable to, for example, a sensor network system including a server for managing and controlling the entire system and a plurality of sensor nodes. The present invention also relates to a communication device for use in such a communication system.

2. Description of the Background Art

A sensor network system includes sensor nodes serving as communication devices. Such communication devices may often be developed with cost reduction prioritized, thus requiring the following restrictions to be satisfied.

The first restriction is that sensor nodes may not always be equipped with a CPU (Central Processing Unit) having high capacity of processing. The second restriction is that sensor nodes may not always be equipped with a tamper-resistant memory.

Additionally, sensor network systems may generally take a multihop communication in which data are transmitted via, or relayed by, plural sensor nodes.

Now, consider an exemplified case where a server in a sensor network system transmits data for updating software to plural sensor nodes. In this case, it is assumed that the server multicasts the update data toward a group of subject nodes in which the software is to be updated, and causes the nodes to accept the received update data as data authenticated by the server. A conventional solution for implementing such authentication for multicast data may be exemplified by a digital signature technique using public key encryption.

However, under the first restriction described above, applying a public key encryption system may lead to an increase in processing load. Therefore, preferably applied may be a common key encryption system which can reduce the processing load. A preferably applicable common key encryption system may be, for example, a procedure for providing both the server and the group of nodes with a group key common thereto such as to authenticate the data provided from the server. Under the second restriction, however, it is difficult to ensure that the group common key owned by the nodes is prevented from leaking out or that the nodes are prevented from being modified so as to fraudulently operate. Therefore, it is required to consider the possibility that even such update data as successfully accepted by the nodes could be offensive software spread by an attacker with bad intention, or could have been falsified by a fraudulent router node relaying the multihop communication.

Under the situations described above, some conventional solutions for attaining resistance to attacks by an attacker masquerading as a server, when supplying nodes with software update data authenticated, are presented by Adrian Perrig, et al., "Secure Broadcast Communication in Wired and Wireless Networks", Kluwer Academic Publishers, (2003), pp. 161-165, Japanese Patent Laid-Open Publication No. 2006-157856, US Patent Application Publication Nos. 2006/0282675 and 2008/0133921 both to Yao.

Perrig, et al., discloses that nodes are temporally synchronized with a server, which changes in every time interval a message authentication key to be used for generating an authentication code of a message. The nodes of this disclosed solution regard message authentication keys as valid only during time intervals in which the keys are respectively allocated. Then, when the server transmits a message, it generates an authentication code and adds the generated authentication code to the message to transmit the message while making a secret of a message authentication key thus regarded as valid during a corresponding time interval from the nodes. Then, after the time interval has elapsed during which the message authentication key is regarded as valid, the server makes the message authentication key open to the nodes.

In turn, the nodes accept the message authentication key thus made open as a key the server has authenticated. Further, the node uses the message authentication key thus successfully accepted to verify an authentication code of the message received in the time interval during which the message authentication key is regarded as valid, thus accomplishing resistance to attacks by an attacker masquerading as the server.

Perrig, et al., also teaches that a solution disclosed in the Japanese '856 Publication is used instead of temporal synchronization for a server to request a node to confirm transmission of a message by means of number-of-authentication synchronization, thereby accomplishing resistance to attacks by an attacker masquerading as the server. In that case, the server confirms that a message intended to be accepted by the group of nodes surely arrives at all the nodes in the group, and thereafter makes the message authentication key open to the public. The releasing of the key to the public represents that the correct message arrives at all the nodes to which the message is intended to be transmitted. Therefore, if an attacker masquerading as the server spreads a message after the message authentication key is released to the public, each of the nodes can regard this masquerading message as a message delayed in the order of reception, thus discarding it.

When a message contains a large size of data such as software update data authenticated, the procedure taught by Perrig, et al., cannot start message authentication until a message authentication key is released to the public, thereby burdening a memory for holding the message with an increased load. In view of the difficulty, both Yao indicated above disclose a procedure for transmitting only an authentication code prior to an authenticated message, and then transmitting the message.

The number-of-authentication synchronization for confirming transmission, as is significant in the conventional solution described above, is presented in order to overcome the difficulty that a node having already known a message authentication key can masquerade as the server to spread a message to other nodes which will be aware of the message authentication key later on.

However, the four conventional solutions described above may be unsuitable, when considering various scenarios of transmitting software update data, for situations where confirmation of transmission by means of number-of-authentication synchronization would not be preferable but could be made imperfect.

The above may be the case with a sensor network which has a node or nodes incommunicable due to, for example, electric power saving and in which the server intends to transmit update data in the order with preference given to adjacent nodes successful in acceptance of authentication on update data, for example, by preferentially causing communicable nodes to accept authentication on update data, or by causing nodes hop-by-hop in multihop communication to accept authentication and receive update data authenticated.

However, such an imperfect synchronization of authentication in a group of nodes may lead to existence of nodes notified of a message authentication key prior to other nodes.

Thus, there could be a possibility that a node preferentially notified of a message authentication key can masquerade as the server to spread a message toward other nodes that will know the message authentication key later on. That problem is involved in those four solutions.

SUMMARY OF THE INVENTION

It is therefore an object of the present invention to provide a communication system in which the security level is not affected by the order of network nodes to which a message is delivered. It is also an object of the invention to provide a communication device applicable to such a communication system.

In accordance with the present invention, in a communication system including a first communication device for transmitting a message and at least one second communication device for receiving the transmitted message and accepting the received message through authentication, the first communication device comprises: a message generator for generating a message authentication key for a first message to be transmitted which is intended to allow the at least one second communication device to accept through authentication, and using the message authentication key to generate an authenticator for the first message to output a second message with the generated authenticator and the message authentication key; a first transmitter for transmitting the second message as data to the at least one second communication device; a first receiver for receiving data from the at least one second communication device and extracting a certification representing an arrival of the transmitted data at the second communication device from the received data; a reception checker for determining whether or not the data transmitted by the first transmitter are the second message and include the certification, the reception checker outputting an identification of the second communication device when a result from the determination is positive; and an information generator operative in response to the identification for generating an authentication key notification, which allows the second communication device to determine that the authentication key notification is genuine information including the message authentication key uniquely specified by and supplied from the first communication device, the first transmitter transmitting the authentication key notification to the at least one second communication device when it is confirmed that the transmitted data are arrived at the second communication device, the at least one second communication device comprising: a second receiver for receiving the data transmitted from the first communication device, and separating information included in the data to output the information; a message holder for holding the second message in the information included in the data; a certification generator for receiving the second message, and generating the certification for the first communication device; an authentication key acquirer for receiving the authentication key notification in the information included in the data transmitted from the first communication device after the first communication device has successfully confirmed the reception in the first communication device, and determining that the authentication key notification is the genuine information uniquely specified to extract and acquire the message authentication key included in the authentication key notification; a message authenticator for using the message authentication key acquired by the authentication key acquirer to generate the second message, and comparing the generated second message with the held second message to confirm that the received message is data from the first communication device; and a second transmitter for transmitting the generated certification to the first communication device.

In accordance with one aspect of the invention, a transmitter communication device on a message transmitter side for transmitting a message toward at least one receiver communication device on a message receiver side accepting a received message through authentication comprises: a message generator for generating a message authentication key for a first message to be transmitted which is intended to allow the at least one receiver communication device, and using the message authentication key to generate an authenticator for the first message to output a second message with the generated authenticator and the message authentication key; a transmitter for transmitting the second message as data to the at least one receiver communication device; a receiver for receiving data from the at least one receiver communication device and extracting a certification representing an arrival of the transmitted data at the at least one receiver communication device from the received data; a reception checker for determining whether or not the data transmitted by the transmitter are the second message and include the certification, the reception checker outputting an identification for the receiver communication device when a result from the determination is positive; and an information generator operative in response to the identification for generating an authentication key notification, which allows the receiver communication device to determine that the authentication key notification is genuine information including the message authentication key uniquely specified and supplied from the transmitter communication device, the transmitter transmitting the authentication key notification to the at least one receiver communication device when it is confirmed that the transmitted data are arrived at the at least one receiver communication device.

In accordance with another aspect of the invention, a receiver communication device on a message receiver side for receiving a message transmitted from a transmitter communication device on a message transmitter side to accept the received message through authentication comprises: a receiver for receiving data transmitted from the transmitter communication device, and separating information included in the data to output the information; a message holder for holding a message with authenticator in the information included in the data; a certification generator for receiving the message with authenticator, and generating the certification for the transmitter communication device; an authentication key acquirer for receiving the authentication key notification in the information included in the data transmitted from the transmitter communication device after the transmitter communication device has successfully confirmed the reception in the transmitter communication device, and determining that the authentication key notification is genuine information uniquely specified to extract and acquire the message authentication key included in the authentication key notification; a message authenticator for using the message authentication key acquired by the authentication key acquirer to generate the message with authenticator, and comparing the generated message with authenticator with the held message with authenticator to confirm that the received message is data from the transmitter communication device; and a transmitter for transmitting the generated certification to the transmitter communication device.

In accordance with the present invention, confirmation and authentication of messages are proceeded to step by step, and therefore a communication system can be provided in which the security level of delivered messages is not affected by the order of network nodes to which a message is delivered, thus security being sufficiently ensured.

BRIEF DESCRIPTION OF THE DRAWINGS

The objects and features of the present invention will become more apparent from consideration of the following detailed description taken in conjunction with the accompanying drawings in which:

FIG. 2B is a schematic block diagram showing the functional configuration of an illustrative embodiment of a message receiving device in the sensor network system shown in FIG. 1;

FIG. 9B is a schematic block diagram, like FIG. 2B, showing the functional configuration of an alternative embodiment of a message receiving device in the sensor network system shown in FIG. 1;

FIG. 16A is a schematic block diagram, like FIG. 2A, showing the functional configuration of a message transmitting device shown in FIG. 14;

FIG. 17 schematically shows the contents of signals sent out in operation in the sensor network system shown in FIG. 14.

DESCRIPTION OF THE PREFERRED EMBODIMENTS

Figure 1:
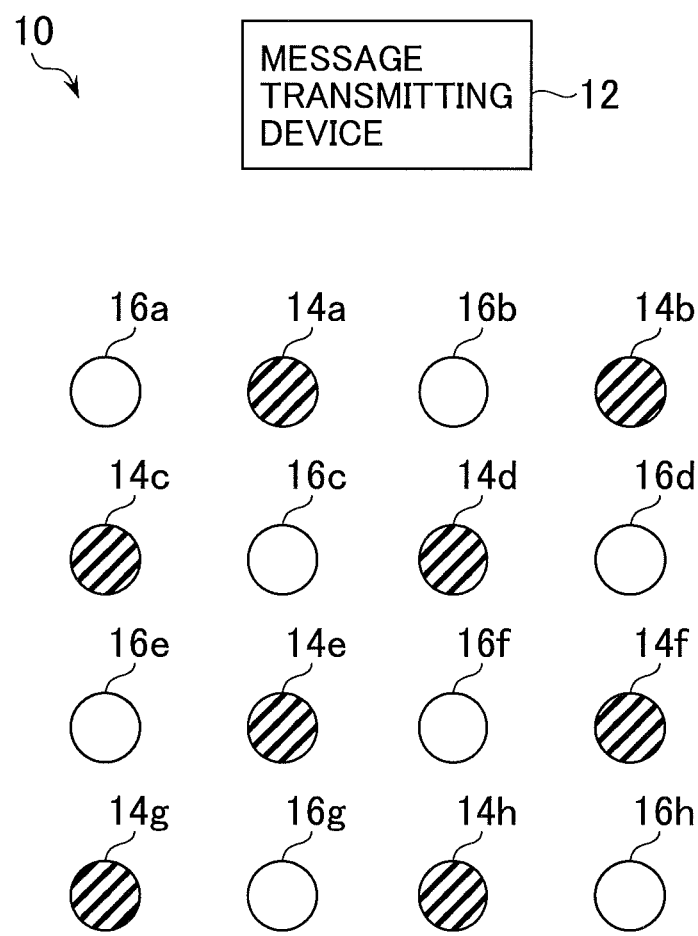
FIG. 1 schematically shows the configuration of an illustrative embodiment of a sensor network system to which applied is a communication system in accordance with the present invention.

Well, reference will be made to accompanying drawings to describe in detail a communication system in accordance with preferred embodiments of the present invention. Generally with reference to FIGS. 1, 2A and 2B, the communication system in accordance with a preferred embodiment of the invention is adapted to a sensor network system 10, in which messages are transmitted between a message transmitting device 12 and one or more message receiving devices 14 and 16 with security established. As will be described later, the message receiving devices 14 and 16 may be designated with reference numerals 14a through 14h and 16a through 16h when they need to be individually specified. Further, the message receiving devices 14 and 16 may be the same in structure as each other, as will be described later. In addition, only for the purpose of illustrating the invention, a message to be transmitted is directed from the message transmitting device 12 to one or more message receiving devices 14 and 16. In that context, the message transmitting device 12 may be referred to as a communication device on the message transmitter side, which may be a server, and the message receiving devices 14 and 16 may be referred to as communication devices on the message receiver side, which may be network nodes.

Figure 2A:
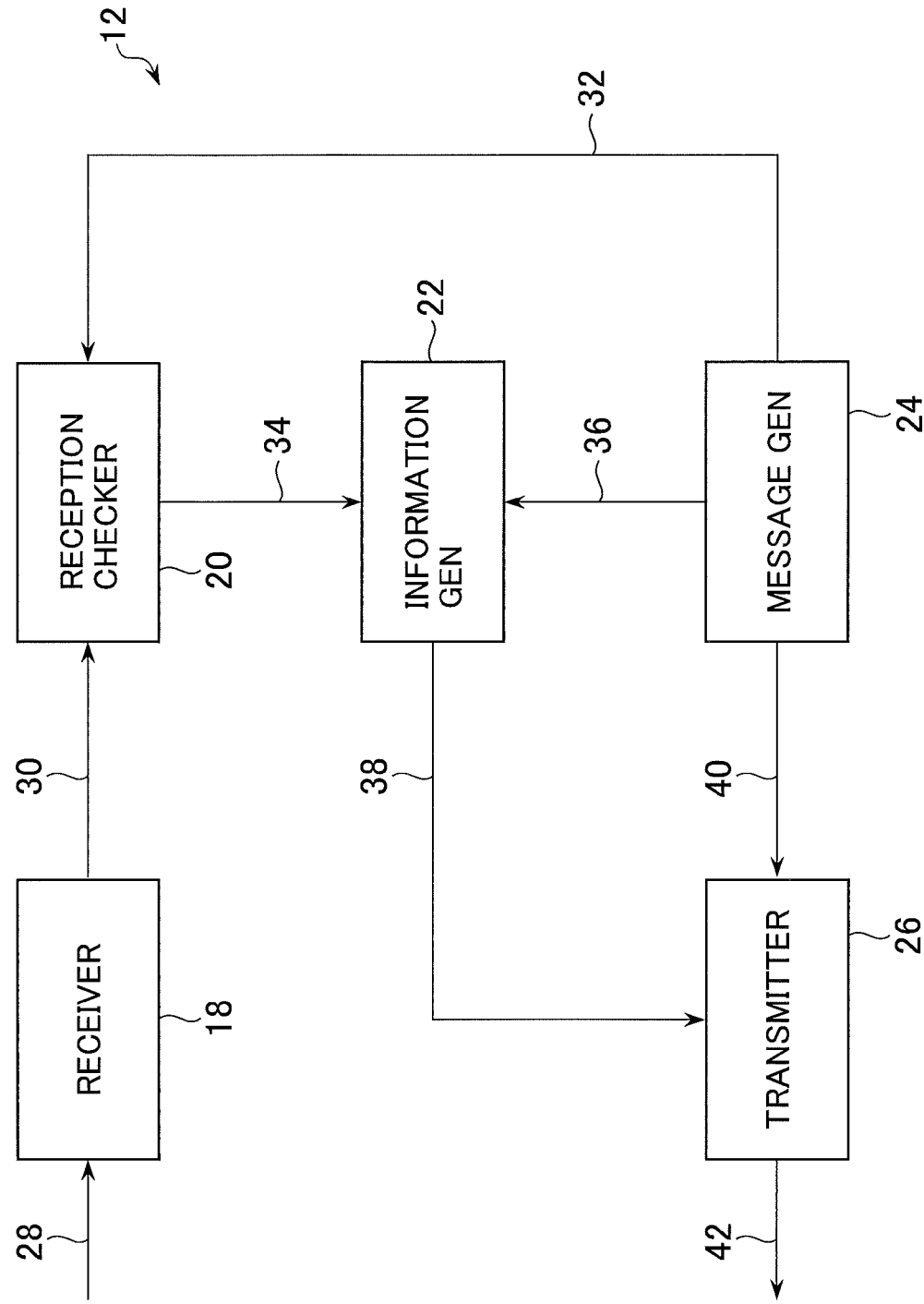
FIG. 2A is a schematic block diagram showing the functional configuration of an illustrative embodiment of a message transmitting device in the sensor network system shown in FIG. 1.

In the message transmitting device 12, FIG. 2A, i.e. communication device on the message transmitting side, a message generator 24 generates a message authentication key for a message to be transmitted which is intended to be accepted through authentication by a communication device or devices 14 on the message receiver side, i.e. receiver communication devices, and uses the message authentication key to generate an authentication code, or authenticator, for that message to output the message with the authenticator thus generated on connections 32 and 40. Signals or data are designated with reference numerals of connections on which they are conveyed. The message 32 will be transmitted as data through a transmitter 26 to the message receiving devices 14. A receiver 18 receives data 28 from a communication device 14 on the message receiver side and extracts from the received data 28 a certification 30 confirming the arrival of the transmitted data at the communication device 14 on the message receiver side to transfer the certification 30 to a reception checker 20. The reception checker 20 checks the message with authenticator 32 to determine whether or not the message 32 includes the certification 30, and feeds an information generator 22 with the identification (ID) 34 of a communication device 14 on the message receiver side on which a result from the determination is positive. The information generator 22 receives a message authentication key 36 used for generating the message with authenticator 32 from the message generator 24, and is responsive to the inputted identification 34 to produce an authentication key notification 38 to the transmitter 26. The authentication key notification 38 is information allowing an appropriate communication device 14 on the message receiver side to confirm that it is correct, or genuine, information including a message authentication key uniquely specified. The transmitter 26 will send out the authentication key notification 38 as data 42.

In each of the message receiving devices 14, FIG. 2B, on the message receiver side, a receiver 44A receives data 56 transmitted from the message transmitting device 12, and separates information included in the data 56 to transfer a message with authenticator 58, an authentication key notification 60, and data 62 including a destination corresponding to a communication device 14 other than the own device 14, on which the receiver 44A is installed, to a message holder 46, an authentication key acquirer 48, and a transmitter 54, respectively. The message holder 46 holds the message with authenticator 58. The message holder 46 transfers the message with authenticator 64 to a certification generator 50, which in turn produces a certification 70, for the message transmitting device 12, on the arrival of the message with authenticator 64 thus supplied to transmit the certification 70 through the transmitter 54 as data 72 to the message transmitting device 12. The authentication key acquirer 48 determines whether or not the inputted authentication key notification 60 is information uniquely specified, and extracts, or acquires, a message authentication key included in the authentication key notification. The acquired message authentication key 68 is used by a message authenticator 52A to produce a message with authenticator, which will be compared to the held message with authenticator 66 to thereby confirm whether or not the received message is data transmitted from the message transmitting device 12. Such a stepwise checking and authentication based on the order of delivering messages can advantageously prevent the security level of the delivered messages from deceasing, thus sufficiently maintaining the security.

The sensor network system 10, which is an illustrative embodiment implementing a communication system in accordance with the invention, includes as shown in FIG. 1 the message transmitting device 12 functioning as a server and the message receiving devices 14 and 16 functioning as network nodes having sensors. The sensor network system 10 has a function to transmit and receive detected information between the server 12 and the nodes 14 and 16.

More specifically, the message transmitting device 12 is a server managing and controlling the entire system 10 to transmit messages to the sensor nodes 12 and 14. The message receiving devices 14 and 16 are sensor nodes adapted for receiving messages from the server 12 to accept the messages through authentication. The instant illustrative embodiment includes sixteen sensor nodes 14a through 14h and 16a through 16h located around the server 12. The number of the message receiving devices, or sensor nodes, located in the sensor network system 10 may not be restrictive.

The message transmitting device 12 has a function to notify a message receiving device or devices 14, on which the arrival of a message is successfully confirmed, of a message authentication key uniquely specified in the form allowing receiving devices 14 to confirm that the notification has come from the transmitting device 12 per se.

The contents, format and kind of messages to be transmitted by the message transmitting device 12 may not be restrictive. Such messages may be text or character data. Further, such data may be binary data, or may be, for example, execution program data, patch data for updating a program, or image data.

The message receiving devices 14 have a function to acquire, when notified of a message authentication key by the message transmitting device 12, the notified message authentication key only when this message authentication key thus notified can be determined as genuine information uniquely specified by the message transmitting device 12. With the illustrative embodiment, the message receiving devices 14a through 14h belong to the same group of nodes on the sensor network 10. This group will be designated with a code G101 and is set as an object for which a message or messages is/are to be destined.

The remaining message receiving devices, i.e. 16a to 16h, are set so as not to belong to the group G101. Since the message receiving devices 16a through 16h thus do not belong to the group G101, the message transmitting device 12 does not set the message receiving devices 16a through 16h as objects for which a message or messages is/are to be destined.

The message receiving devices 16a through 16h may or may not be the same in structure as the message receiving devices 14a through 14h.

The message transmitting device 12 may directly access message receiving devices 14 when they are capable of direct wireless communication. In order to communicate with a message receiving device 14 incapable of direct wireless communication, the message transmitting device 12 may access that incapable message receiving device 14 by multi-hop wireless communication via another message receiving device 14 capable of direct wireless communication.

The message transmitting device 12 is allowed to use any routes when communicating with message receiving devices 14. The message transmitting device 12 can use, for example, known routing protocols. Additionally, in the sensor network system 10, packets flowing between the message transmitting device 12 and the message receiving devices 14 may be routed to pass only the nodes belonging to the group G101.

The message transmitting device 12 has the function, in addition to that of a server, of producing and transmitting messages, and of receiving data, to and from the sensor nodes 14 and 16. The message transmitting device 12 includes, as shown in FIG. 2A, the receiver 18, the reception checker 20, the information generator 22, the message generator 24 and the transmitter 26 which are interconnected as depicted.

Specifically, the message transmitting device 12 may have components and elements, such as a CPU (Central Processing Unit), a ROM (Read-Only Memory), a RAM (Random Access Memory), an EEPROM (Electrically Erasable Programmable Read-Only Memory) and an external storage unit such as a hard disk drive, for executing program sequences, as well as a unit having an interface function for communicating with other communication devices 14 and 16. Those components, elements and/or unit may have communication programs in accordance with the illustrative embodiments installed therein so as to configure the message transmitting device 12. The communication programs may include, for example, a communication control program causing the processor system to function as a communication device 12 on the message transmitter side. Such communication programs may be stored in an external storage unit or medium such as hard disk drive, optical disk or magneto-optical disk, not specifically shown in the figures. That is also the case with alternative embodiments of the invention that will be described later on.

It is to be noted that the message transmitting device 12 may not be implemented by such a single processor system as with the present embodiment but instead by plural processor systems adapted to accomplish decentralized processing. Even in such a case of complex configuration, from a viewpoint of functionality, the message transmitting device 12 can be represented as shown in FIG. 1.

The receiver 18 has the function of receiving reception a certification or data 28 sent from any of the message receiving devices 14a through 14h to output the received reception certification 28 as a reception certification 30 to the reception checker 20.

The reception checker 20 has a function to verify whether or not a message with authenticator the message transmitting device 12 has transmitted reaches targeted message receiving devices 14 without feigning. In order to implement this, the reception checker 20 is adapted to receive a reception certification 30 outputted by the receiver 18 and a message with authenticator 32 outputted by the message generator 24 to check, or determine, whether or not the message with authenticator 32 reaches targeted message receiving devices 14 without feigning. This checking is proceeded to in such a fashion that, for example, the reception checker 20 shares a key with each of the message receiving devices 14a through 14h in combination therewith to verify whether or not a reception certification 30 provided from the receiver 18 is generated by using the shared key and the message with authenticator 32. The manner of checking may not be restrictive to this specific example. When the reception checker 20 succeeds in checking that the message with authenticator 32 has reached targeted message receiving devices 14 without feigning, it supplies the information generator 22 with the identifications 34 of appropriate message receiving devices 14. The identification 34 includes a message authentication key.

The information generator 22 has a function to notify the message receiving devices 14 of a message authentication key used for generating the authenticator for a message. The information generator 22 is fed with, as described below, a message authentication key 36 the message generator 24 has used for producing the message with authenticator 32.

The information generator 22 has a function to generate, when it receives from the reception checker 20 the identification of a receiving device 14, to which an arrival of a message with authenticator 32 has been confirmed, an authentication key notification 38 in order to transfer the message authentication key 36 to a message receiving device 14 associated with that identification.

The authentication key notification 38 includes a message authentication key 36. The authentication key notification 38 may preferably be information by means of which a message receiving device 14 can confirm correct information duly coming from, and uniquely specified by, the message transmitting device 12. The authentication key notification 38 may be formed such that, for example, the information generator 22 shares a key with each of the message receiving devices 14a through 14h in combination therewith, and uses the key to generate an authenticator for a message authentication key 36 to include the authenticator thus generated in the authentication key notification 38. The authentication key notification 38 may be encrypted. The authentication key notification 38 may additionally include a reception certification the reception checker 20 has developed when successful in verification. The inclusion of a reception certification in the authentication key notification allows a message receiving device 14, when having received plural messages with authenticator, to determine which of the messages with authenticator the authentication key notified is directed to. The information generator 22 transfers the generated authentication key notification 38 to the transmitter 26.

The message generator 24 functions as generating an authenticator for a message intended to be accepted through authentication by a message receiving device or devices 14 to produce a message with authenticator on the interconnections 32 and 40. The message generator 24 first generates a message authentication key for use in generating an authenticator for the message. It may not particularly restrictive how to generate a message authentication key. For example, a pseudo-random number generator may be applied.

The message generator 24 then uses the generated message authentication key to generate an authenticator 40 for the message intended to be accepted through authentication by the message receiving device or devices 14. It may also not be restrictive how to generate the message with authenticator 32 and 40. For example, a keyed hash function or other functions such as a MAC (Message Authentication Code) function are available. Additionally, the message with authenticator 32 and 40 generated by the message generator 24 may be encrypted. The message generator 24 transfers the generated message with authenticator 32 and 40 to the reception checker 20 and the transmitter 26, respectively, and the generated message authentication key 36 to the information generator 22.

Alternatively, the message generator 24 may be adapted to generate, instead of the message with authenticator 32 and 40 for a message (first message) intended to be accepted through authentication by a message receiving device or devices 14, a message with authenticator serving as transmission announcement information (second message) of the first message.

The second message is information for use in authenticating the first message. For example, the second message may include an authenticator for the first message generated by using a message authentication key. Alternatively, the second message may be generated such that the message generator 24 generates a key separately from the message authentication key and uses the generated key to generate an authenticator for the first message to include both authenticator and generated key therein. Further alternatively, the second message may include an authentication code, or authenticator, which the message transmitting device 12 separately generates for the first message by means of a key shared with a message receiving device 14.

Thus in the instant illustrative embodiment, instead of a message to be intended to be accepted through authentication, the transmission announcement information of a message may be dealt with an object for authentication, so that the process of authenticating the message can be separated from the process of transmitting the message. In this case, the message generator 24 will also forward the first message 40 to the transmitter 26.

The transmitter 26 carries a network interface function for enabling the message transmitting device 12 to communicate with other communication devices 14 and 16. A communication system or protocol for use in the transmitter 26 may not be restricted.

The transmitter 26 serves as transmitting a message with authenticator 40 fed from the message generator 24 as a message with authenticator 42 to destined one or ones of the message receiving devices 14a through 14h. Destined message receiving device or devices, or destination devices, may be referred to as an object or objects for transmission. For example, when the transmitter 26 is adapted to receive a first message, referred to in the above, from the message generator 24, it transmits the first message 40 as the message 42 to destined message receiving device or devices 14 serving as an object or objects for transmission. When a message is to be transmitted to plural ones of the message receiving devices 14a through 14h, the transmitter 26 may broadcast or multicast it.

If data to be transmitted exceed the size of a packet, i.e. capacity transmittable at a time, then the transmitter 26 may divide the data into plural packets to transmit the latter. Additionally, such packets may have an authenticator separately added, or may be encrypted. The transmitter 26 further serves as transmitting an authentication key notification 38 supplied from the information generator 22 to destined one or ones of the message receiving devices 14a through 14h.

Next, a schematic configuration of the message receiving device 14 will be described with reference to FIG. 2B. The message receiving devices 14a through 14h may be of the same structure. The message receiving device 14 includes the receiver 44, the message holder 46, the authentication key acquirer 48, the certification generator 50, the message authenticator 52A and the transmitter 54 which are interconnected as shown in the figure.

The message receiving device 14 may have components, such as a CPU, a ROM, a RAM, an EEPROM and a hard disk drive, for executing program sequences, as well as a unit having an interface function for communicating with other communication devices 12, 14 and 16. The message receiving device 14 may not be implemented by such a single processor system as with the illustrative embodiment but instead by plural processor systems adapted to perform decentralized processing. Those components, elements and unit may have communication programs in accordance with the illustrative embodiment installed therein so as to configure the message receiving device 14. The communication programs may include a communication control program causing the processor system to function as a communication device on the message receiver side.

The receiver 44 has a network interface function for allowing the message receiving device 14 to communicate with other communication devices 12, 14 and 16. A communication system or protocol for use in the receiver 44 may not be restricted.

The receiver 44 has a function to receive data 56 transmitted from other devices 12 and 14, and to supply, according to the contents or kind of the received data 56, data 58, 60 and 62 to the message holder 46, the authentication key acquirer 48 and the transmitter 54, respectively.

Specifically, when the received data 56 are a message with authenticator 40, the receiver 44 may supply the data 56 as a message with authenticator 58 to the message holder 46. When the received data 56 are an authentication key notification 38, the receiver 44 may supply the data 56 as the authentication key notification 60 to the authentication key acquirer 48. When the received data 56 include supplied information has its destination corresponding to a communication device other than the own device 14 on which the receiver 44 is installed, the receiver 44 delivers the data 56 as the data 62 to the transmitter 54.

The message holder 46 has the function of storing a message with authenticator 40 supplied from the receiver 44 until the message authentication key 38 is notified. The message holder 46 outputs the supplied message with authenticator 40 as messages 64 and 66 to the certification generator 50 and the message authenticator 52, respectively. When the message holder 46 receives a first message, described earlier, from the receiver 44, it supplies the received first message 66 to the message authenticator 52.

The authentication key acquirer 48 has a function to receive a authentication key notification 60 from the receiver 44, and verify whether or not a message authentication key included in the authentication key notification 60 is correct information transmitted from the message transmitting device 12. Only when the authentication key acquirer 48 succeeds in confirming that the message authentication key is genuine information, it takes in that message authentication key.

The authentication key notification 60 may preferably be information by means of which confirmation can be made on genuine information uniquely specified and generated by the message transmitting device 12. For example, the authentication key acquirer 48 of each of the message receiving devices 14 and 16 shares a key with the message transmitting device 12 in combination therewith, as described earlier. The authentication key notification 60 therefore includes a message authentication key 38. That allows the authentication key acquirer 48 to check the verification, or authentication, by determining whether or not the authentication key notification has an authenticator added thereto which was generated by means of the shared key. The authentication key acquirer 48 outputs the acquired message authentication key 68 to the message authenticator 52.

The certification generator 50 is adapted to generate a reception certification 70 in order to certify an assured reception of the message with authenticator 64 supplied from the message holder 46 before the message transmitting device 12. This certification may be made by, for example, using, together with the message with authenticator 64, a key shared by the certification generator 50 of the message receiving device 14 with the message transmitting device 12 to generate the reception certification 70. However, the manner of certification described above may not be restrictive. The certification generator 50 outputs the generated reception certification 70 to the transmitter 54.

The message authenticator 52 is adapted for receiving the message with authenticator 66 from the message holder 46, and verifying the authenticator of the message with authenticator 66 by means of the message authentication key 68 supplied from the authentication key acquirer 48 to thereby confirm that the message 66 is correct information transmitted by the message transmitting device 12. Additionally, when the message authenticator 52 receives a first message, as described earlier, from the message holder 46, it may use a second message representing a success in authentication to confirm that the first message is genuine information transmitted by the message transmitting device 12.

The transmitter 54 carries a network interface function for enabling the message receiving device 14 to communicate with other communication devices 12, 14 and 16. A communication system or protocol for use in the transmitter 54 may not be restricted. The transmitter 54 is adapted to transmit a reception certification 70 provided from the certification generator 50 toward the message transmitting device 12. The transmitter 54 transmits data 72 including the reception certification 70 to the message transmitting device 12. Additionally, when the transmitter 54 receives from the receiver 44 information on a destination corresponding to a communication device 12, 14 or 16 other than the own device 14 on which the transmitter 54 is mounted, the transmitter 54 may transmit the received information toward the other communication device.

Next, the operation of the sensor network system 10 of the instant illustrative embodiment will be described. The operation of authenticating a message in the message transmitting device 12 can generally be classified into the first, second and third phases as described below.

Figure 3:
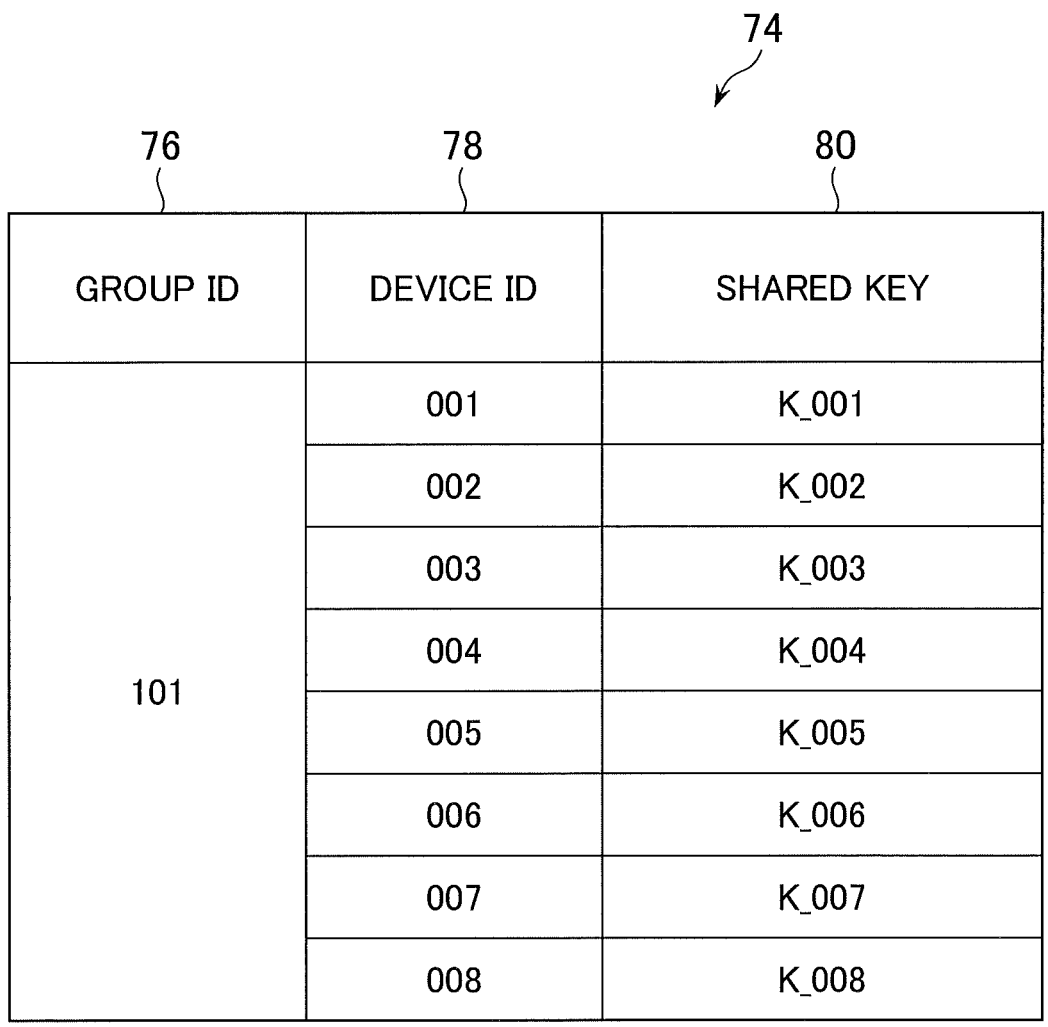
FIG. 3 shows an example of data in a group managing table held by the message transmitting device shown in FIG. 2A.

Description will be made on an exemplified case where the message transmitting device 12 authenticates a predetermined message "M" to such ones of the sixteen message receiving devices 14a to 14h and 16a to 16h which belong to the group G101 as objects for transmitting the message. It is to be noted that the message transmitting device 12 includes and manages a group managing table 74, shown in FIG. 3, holding various information on the group G101, as will be described below.

The group managing table 74 contains information on the identifications 78 and shared keys 80 of the message receiving devices 14a through 14h belonging to the group represented by a group identification 76. On the table 74, message receiving devices 14 are classified by the group identification 76.

In this example, the group G101 has its group identification 76 set to "101". The message receiving devices 14a through 14h have the device identifications 78 thereof set to "001" through "008", and the shared keys 80 thereof represented as "K_001" through "K_008", respectively. It is to be noted in the sensor network system 10 that the message transmitting device 12 has its identification set to "000".

According to the information stored in the group managing table 74, the group G101 is formed by eight message receiving devices 14*a* through 14*h*, and the message transmitting device 12 shares different one of the keys "K_001" through "K_008" with each of the message receiving devices 14*a* through 14*h* in combination therewith.

Figure 4:
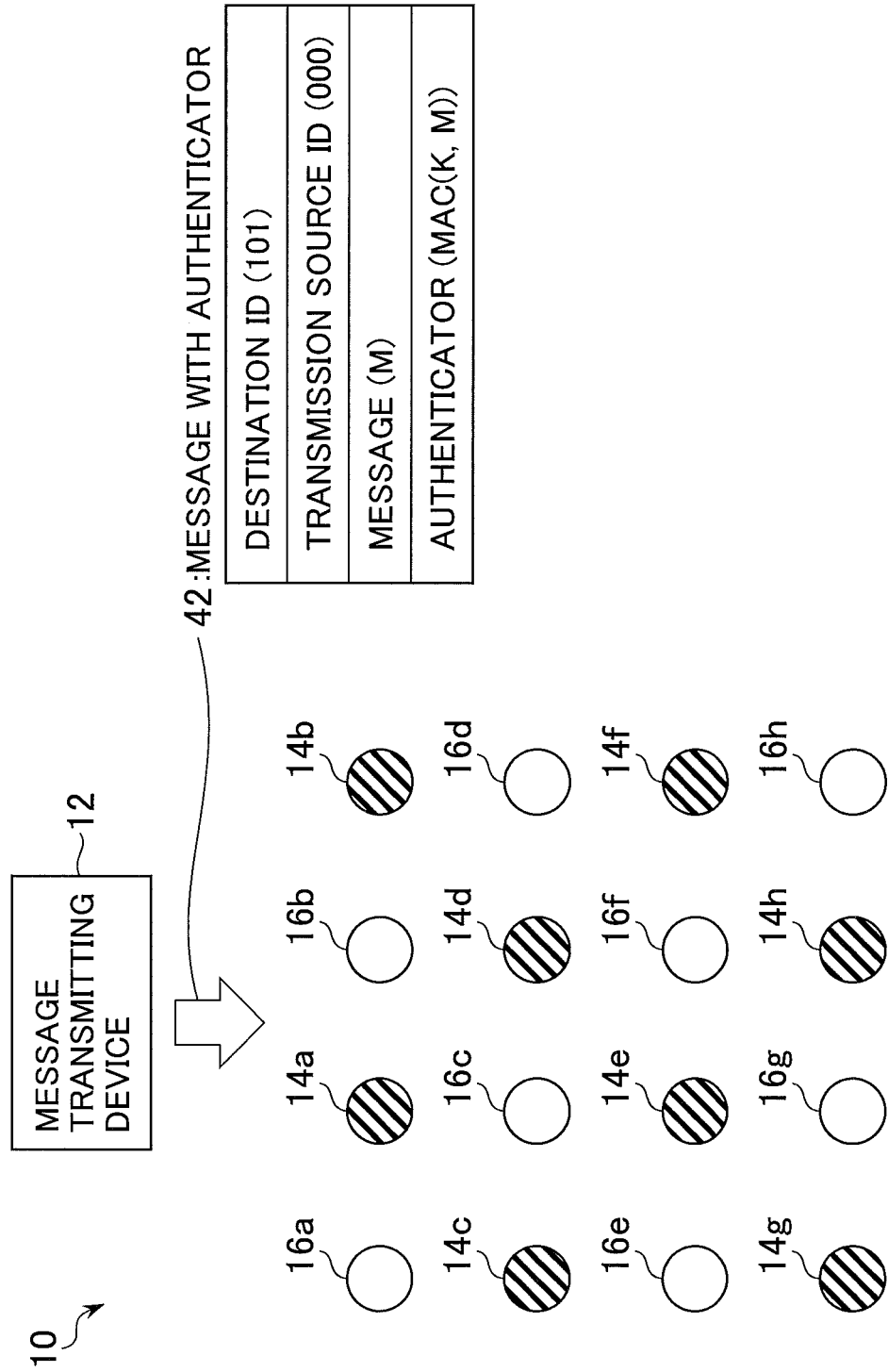
FIGS. 4, 5 and 6 schematically show the contents of signals sent out in a first, a second and a third phase of operation, respectively, in the sensor network system shown in FIG. 1.

Next, the first phase of operation of the sensor network system 10 will be described with reference to FIG. 4. The first phase is the process of transmitting a message with authenticator 40.

First, the message generator 24 of the message transmitting device 12 generates a message authentication key "K", and generates an authenticator MAC (K, M) for the message "M". The term MAC (X, Y) represents an authenticator generated by using a key X for a string of data Y.

The message transmitting device 12 transmits a message with authenticator 40 as the output data 42 from the transmitter 26 to the message receiving devices 14*a* through 14*h* belonging to the group G101.

Figure 5:
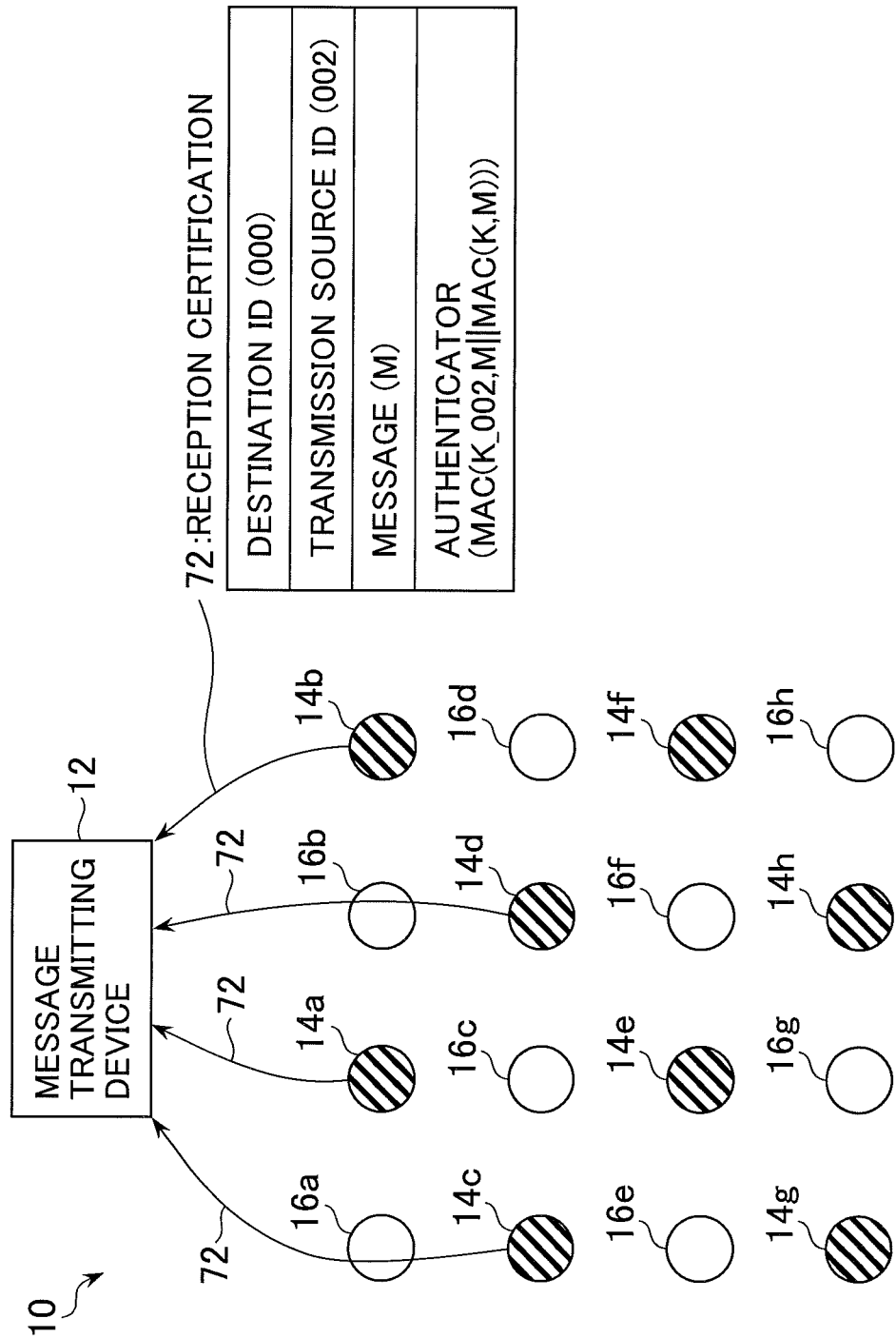

Next, the second phase of operation of the sensor network system 10 will be described with reference to FIG. 5. The second phase is the process of transmitting a reception certification 70 and checking a reception of the supplied message 56. The process of the second phase will be described with the message receiving device 14*b* taken as an example.

The message receiving device 14*b* receives the data 56 by the receiver 44. When the received data 56 are a message with authenticator, the message receiving device 14*b* transfers the received data as a message with authenticator 58 to the message holder 46, which will in turn store the transferred data therein.

The certification generator 50 uses the key "K_002" shared with the message transmitting device 12 in combination therewith to generate an authenticator MACK (K_002, M∥MAC (K, M)) for the message with authenticator 58 supplied from the message holder 46. The term X∥Y represents a string of data obtained by combining the string of data X with the string of data Y.

The transmitter 54 of the message receiving device 14*b* transmits the data 72 including the supplied reception certification 70 toward the message transmitting device 12. The receiver 18 of the message transmitting device 12 receives as data 28 the data 72 including the reception certification 70 from the message receiving device 14*b*, and outputs the received reception certification 30 to the reception checker 20.

The reception checker 20 checks, for the message with authenticator 32 provided from the message generator 24, i.e. for M∥MAC (K, M), whether or not the authenticator MAC (K_002, MAC (M∥MAC (K, M))) generated by using the key "K_002" shared with the message receiving device 14*b* in combination therewith is matched with the authenticator included in the reception certification supplied through the receiver 18. When both authenticators match with each other, the message 32 with authenticator M∥MAC (K, M) is determined as surely having arrived at the message receiving device 14*b*. The reception checker 20 responds to this result to supply an identification 34 representing "002" to the information generator 22.

The operation of the message receiving devices 14*a*, 14*c* and 14*d* may be similar to the message receiving device 14*b*, and will not be described. In this example, the message transmitting device 12 fails to receive the reception certification 70 from the message receiving devices 14*e* through 14*h*, and therefore determines that the message with authenticator 40 has not arrived at those four devices.

Figure 6:
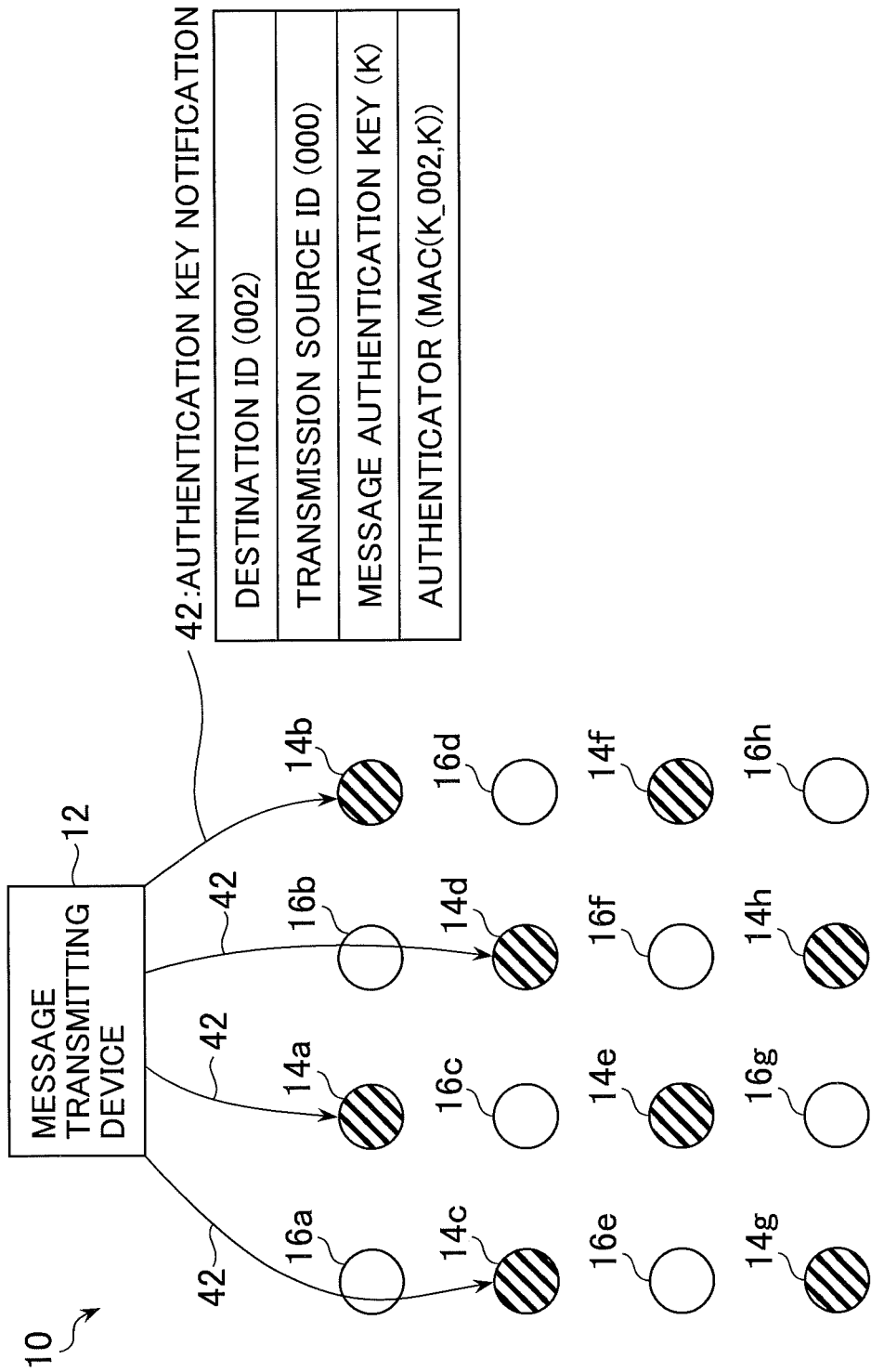

Next, the third phase of operation of the sensor network system 10 will be described with reference to FIG. 6. The third phase of operation is the process of notifying the message authentication key and authenticating the message.

The information generator 22 of the message transmitting device 12 acquires the identifications 34 of the message receiving devices 14*a* through 14*h* from the reception checker 20. More specifically, the information generator 22 uses the key "K_002" shared with the message receiving device 14*b* in combination therewith in this embodiment. The authenticator MAC (K_002, K) is thereby generated for the message authentication key 36 "K" supplied from the message generator 24. The authentication key notification 38 is transmitted as data 42 through the transmitter 26 to the message receiving device 14*b*.

The receiver 44 of the message receiving device 14*b* receives the data 42 as data 56, and transfers the authentication key notification 60 included in the received data 56 to the authentication key acquirer 48. The authentication key acquirer 48 uses the key "K_002" shared with the message transmitting device 12 in combination therewith to verify whether or not the message authentication key "K" included in the authentication key notification 60 is acceptable. When a result from the verification is positive, the authentication key acquirer 48 determines that the message authentication key "K" is correct information transmitted by the message transmitting device 12. The message authentication key "K" can thus be correct information uniquely specified and coming from the message transmitting device 12, so that the authentication key acquirer 48 acquires this message authentication key "K", and supplies the acquired message authentication key "K" 68 to the message authenticator 52.

Next, the message authenticator 52 uses the supplied message authentication key "K" to generate the authenticator MAC (K, M) for the message "M". The message authenticator 52 verifies whether or not the generated authenticator MAC (K, is matched with an authenticator 66 given together with the message "M" from the message holder 46. When both authenticators match with each other, the message authenticator 52 determines that the message "M" is correct information coming from the message transmitting device 12.

The message receiving devices 14*a*, 14*c* and 14*d* operate similarly. Repetitive descriptions thereon will therefore be refrained from.

In accordance with the instant illustrative embodiment, the message transmitting device 12 notifies a message receiving device 14, having successfully confirmed an arrival of the message, of a message authentication key in the form, or by information, which allows the message receiving device 14 can confirm that the message authentication key is from, and uniquely specified by, the message transmitting device 14. The message authentication key will be taken in only by a message receiving device 14 which can determine that the notified message authentication key is correct information uniquely specified by, and transmitted from, the message transmitting device 12.

Figure 7:
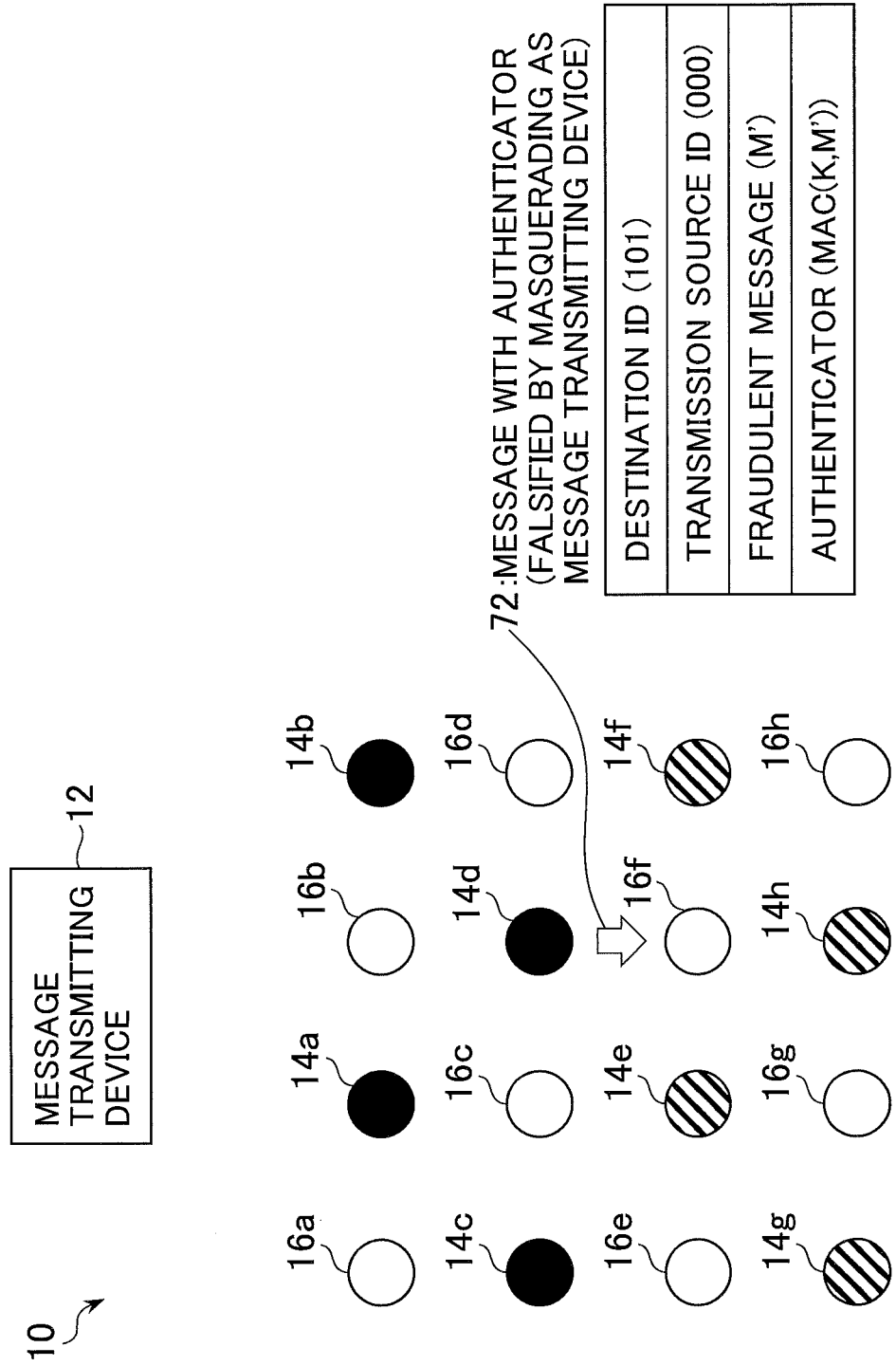
FIG. 7 schematically shows the contents of signals sent out in operation in which a malicious attacker uses some of the message receiving devices in the sensor network system.

In the sensor network system 10, the user operating a message receiving device 14*d* is assumed to be an attacker with bad intention only for illustration purpose, as shown in FIG. 7. It is also assumed that the message receiving device 14*d* is notified earlier of a message authentication key "K". In the figure, filled circles indicate the message receiving devices 14*a* through 14*d*, as objects for transmitting a message, having completed authentication for the message. Hatched circles indicate the message receiving devices 14*e* through 14h, also as objects for transmitting the message, but not yet acquiring the message. Blank circles indicate the message receiving devices 16a through 16h not being objects for transmitting the message.

Figure 8:
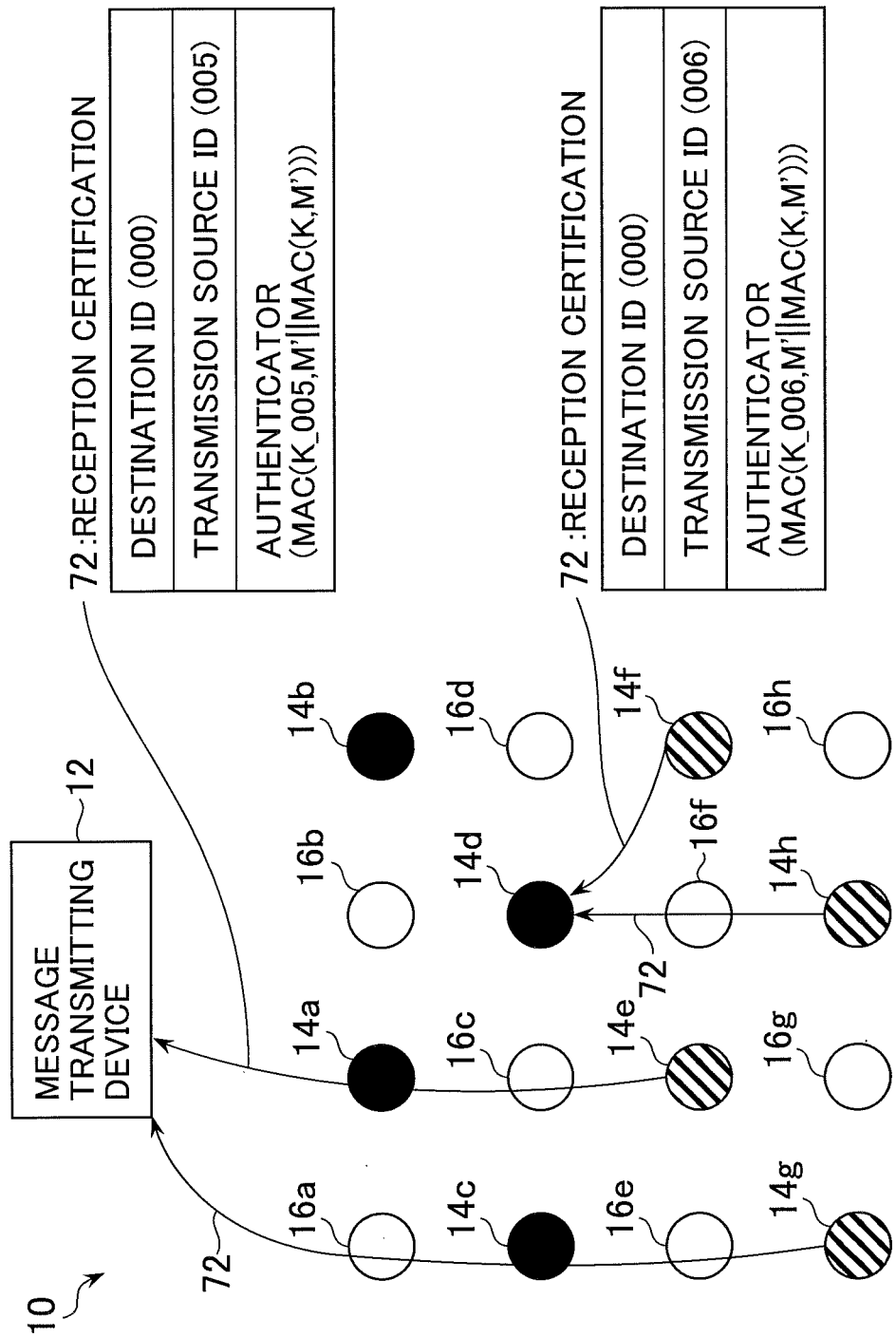
FIG. 8 schematically shows the sensor network system shown in FIG. 1 in operation following the operation shown in FIG. 7 together with the contents of signals sent out when destination devices of a message have not yet acquired the message.

An example will be described in which the message receiving device 14d masquerades as the message transmitting device 12 to try to spread a fraudulent message "Mf" to the message receiving devices 14e through 14h not yet notified of the message authentication key "K". In turn, the message receiving devices 14e through 14h receive the falsified message "Mf" with authenticator, as shown in FIG. 8, and transmit a reception certification for the falsified message "Mf" with authenticator to the message transmitting device 12.

In this situation, if the message receiving devices 14e through 14h acquired the message authentication key "K", they would then determine the fraudulent message "Mf" as a correct message from the message transmitting device 12. However, with the instant illustrative embodiment, the message receiving device 14d never knows key information "K_005" through "K_008" shared by each of the message receiving devices 14e through 14h in combination with the message transmitting device 12, and thus cannot cause the message receiving devices 14e through 14h to acquire the message authentication key "K". Therefore, the message receiving device 14d cannot force the message receiving devices 14e through 14h to accept the authentication key notification.

Moreover, likewise with the reception certification transmitted by the message receiving devices 14e and 14g, if the message transmitting device 12 receives a reception certification for the fraudulent message "Mf", then the message transmitting device 12 fails to detect a consistency of reception certifications transmitted from of the message receiving devices 14a, 14c and 14d with the message with authenticator transmitted by itself, thereby determining the attack.

In summary, with the instant illustrative embodiment, message authentication keys can thus restrictively be acquired only when message authentication keys are notified from the message transmitting device 12. Therefore, even when some of the message receiving devices 14a through 14h in the group G101 as objects for transmitting a message are notified of message authentication keys prior to the remaining message receiving devices in the group, or when some message receiving devices in the group are notified of message authentication keys later than others so as to desynchronize the authentication, the message transmitting device 12 can maintain its resistivity against attacks by a communication device having earlier known a message authentication key and masquerading as the message transmitting device 12. Thus, the sensor network system 10 is advantageous in that the order of the message receiving devices 14a through 14h which a message from the message transmitting device 12 reaches does not affect its security level.

Figure 9A:
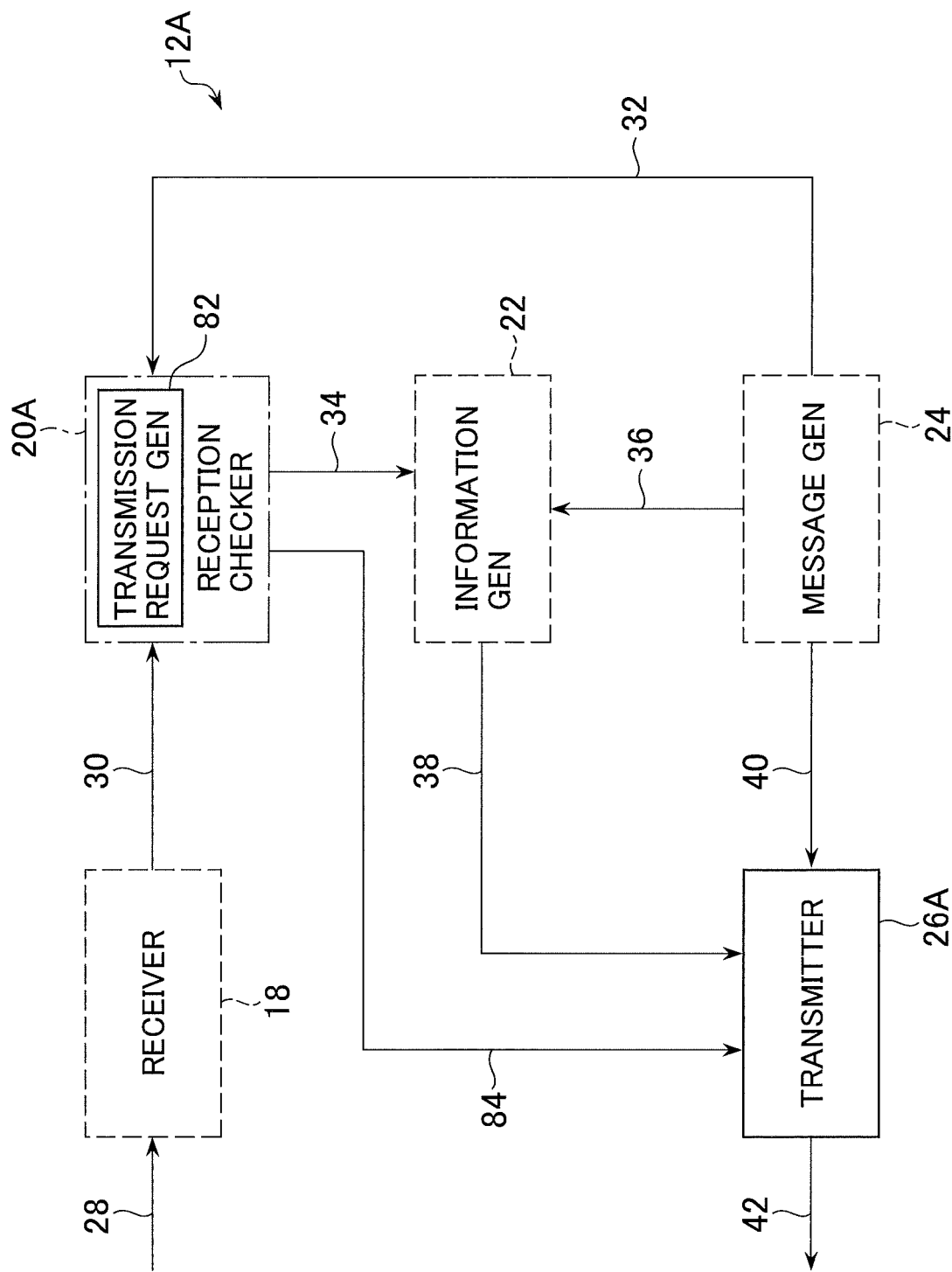
FIG. 9A is a schematic block diagram, like FIG. 2A, showing the functional configuration of an alternative embodiment of a message transmitting device in the sensor network system shown in FIG. 1.

Next, alternative embodiments to the message transmitting device 12 and the message receiving device 14 for use in the sensor network system 10 will be described with reference to FIGS. 9A and 9B. Like components and elements are of course designated with the same reference numerals throughout the patent application. In FIGS. 9A and 9B, the components and elements drawn with dashed line boxes may be the same as the illustrative embodiment shown in and described with reference to FIGS. 2A and 2B, and will not be described repetitively.

The message transmitting device 12A of the alternative embodiment shown in FIG. 9A may be the same as the message transmitting device 12 of the preceding embodiment except for a reception checker 20A and a transmitter 26A. The reception checker 20A may basically be the same as the reception checker 20 of the preceding embodiment except for further including a transmission request generator 82 for generating a transmission request. The transmission request generator 82 is provided in order to request, when the message transmitting device 12A determines that any of the message receiving devices 14a through 14h fails to correctly receive a message with authenticator, any of the message receiving devices 14a through 14h which is considered to already be successful in authentication to forward the message with authenticator. The reception checker 20A outputs the transmission request 84 to the transmitter 26A.

The transmitter 26A may have the same function as the transmitter 20 of the preceding embodiment, and additionally have the function of transmitting the transmission request 84, when supplied from the reception checker 20A, to a message receiving device 14A to which the transmission request 84 is to be received.

The message receiving device 14A of the alternative embodiment shown in FIG. 9B may be applied to the message receiving devices 14b through 14h, and 16a through 16h in the sensor network system 10. The message receiving device 14A may be the same as the message receiving device 14 of the preceding embodiment except for a receiver 44A, a message authenticator 52A and a transmitter 54A.

The receiver 44A has a function to receive data 56 and extract a transmission request from the data 56. The receiver 44A outputs the transmission request 86 extracted from the received data 56 to the message authenticator 52A.

The message authenticator 52A includes an output functional portion 88 for outputting a message with authenticator successful in authentication to the transmitter 54A. Whenever the message authenticator 52A is successful in confirmation of the authentication of a first message 66, as described earlier, provided from the message holder 46, it supplies the transmitter 54A with the first message successful in authentication as a message with authenticator 90. The message authenticator 52A may be adapted to perform those processes in response to a transmission request 86 fed from the receiver 44A.

The transmitter 54A may be the same as the transmitter 54 of the preceding embodiment, and is additionally adapted to be responsive to the message with authenticator 90 successful in authentication and fed from the message authenticator 52A to transmit, in proxy of the message transmitting device 12, the message with authenticator 90 to other message receiving devices 14A to which the message is to be received. Whenever the transmitter 54A receives a first message 90 successful in authentication from the message authenticator 52A, it transmits, in proxy of the message transmitting device 12, the first message 90 to message receiving devices 14 other than the own device 14A on which the transmitter 54A is installed.

In the instant alternative embodiment also, the example is taken in which, in the group G101 of the message receiving devices 14A to which a message is to be destined, when a message receiving device 14d has accepted an authenticated message prior to the remaining message receiving devices 14a, 14b, 14c and 14e through 14h in the group, it transmits or forwards, in proxy of the message transmitting device 12, the message toward those remaining message receiving devices 14a, 14b, 14c and 14e through 14h serving as objects for transmission.

Next, the operation of the sensor network system 10 of the alternative embodiment will be described with reference to FIGS. 10 through 13. Generally, the sensor network system 10 may operate in the same manner as the first, second and third phases of operation as described on the preceding embodiment with reference to FIGS. 4, 5, and 6, and thereafter may proceed to the fourth through seventh phases of operation, which will now be described.

Figure 10:
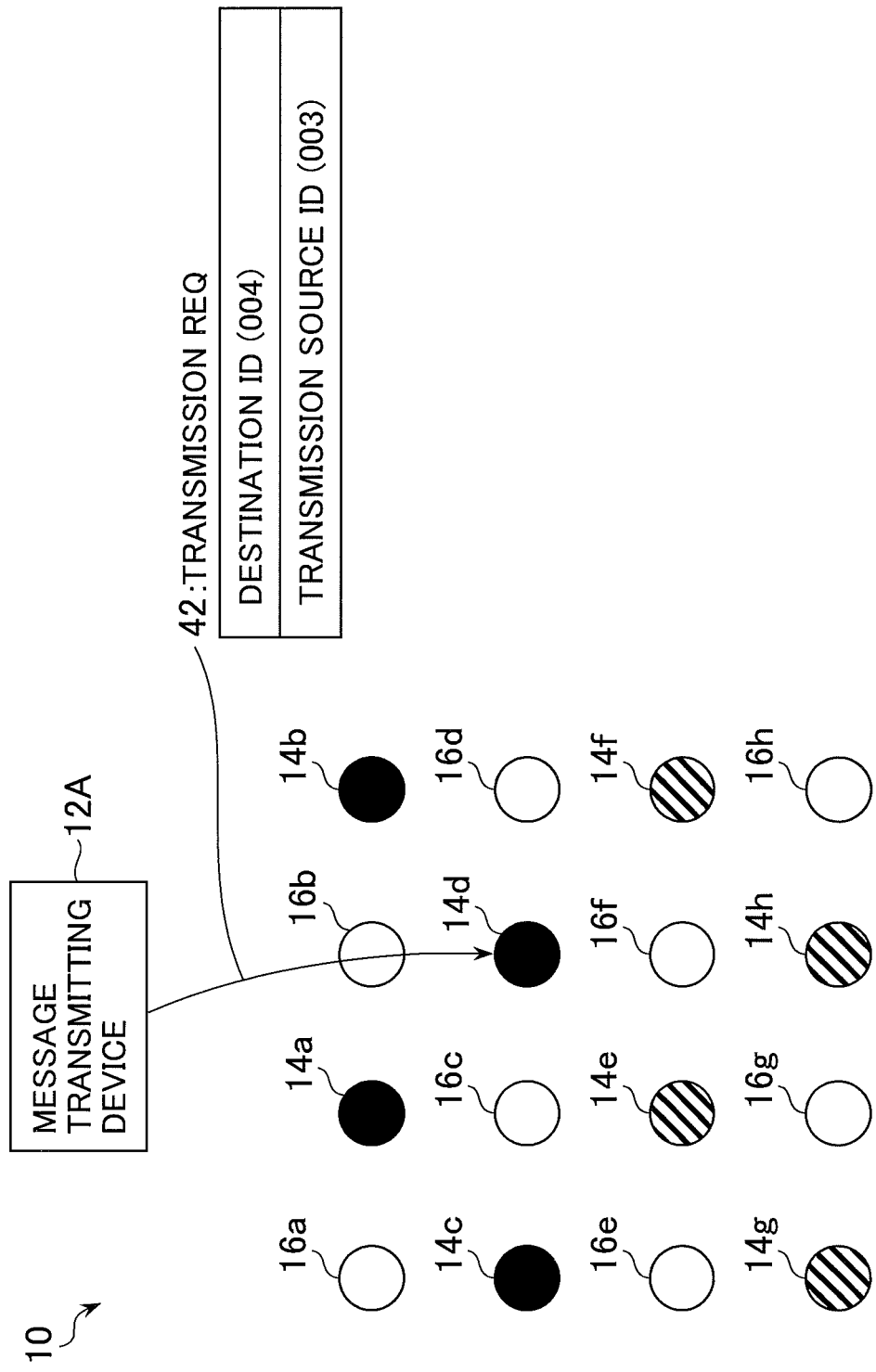
FIGS. 10-13 schematically show the contents of signals sent out in a first, a second, a third and a fourth phase of operation, respectively, in the sensor network system including the message transmitting and receiving devices respectively shown in FIGS. 9A and 9B.

The fourth phase of operation is the process of transmitting a transmission request 84, as shown in FIG. 10. First, it is assumed in the message transmitting device 12A that the reception checker 20A has detected the message receiving devices 14e through 14h as message receiving devices failing to transmit data 72 which would otherwise include a reception certification 70 produced by the certification generator 50 of the message receiving device 14A and which would be included in data 28 the receiver 18 of the message transmitting device 12A has received. Under the circumstances, in order to re-transmit the message with authenticator 90, the reception checker 20A selects any of the message receiving devices 14a through 14d having already released a message authentication key "K" to the public, and generates a transmission request 84 directed to the selected message receiving device 14A.

It may not be restrictive how the message transmitting device 12A selects one of the message receiving devices 14a through 14h already having made a message authentication key to the public. The example will be described with the message receiving device 14d selected. Now, the message transmitting device 12A will transmit the transmission request 84 as data 42 through the transmitter 26A toward the message receiving device 14d.

Figure 11:
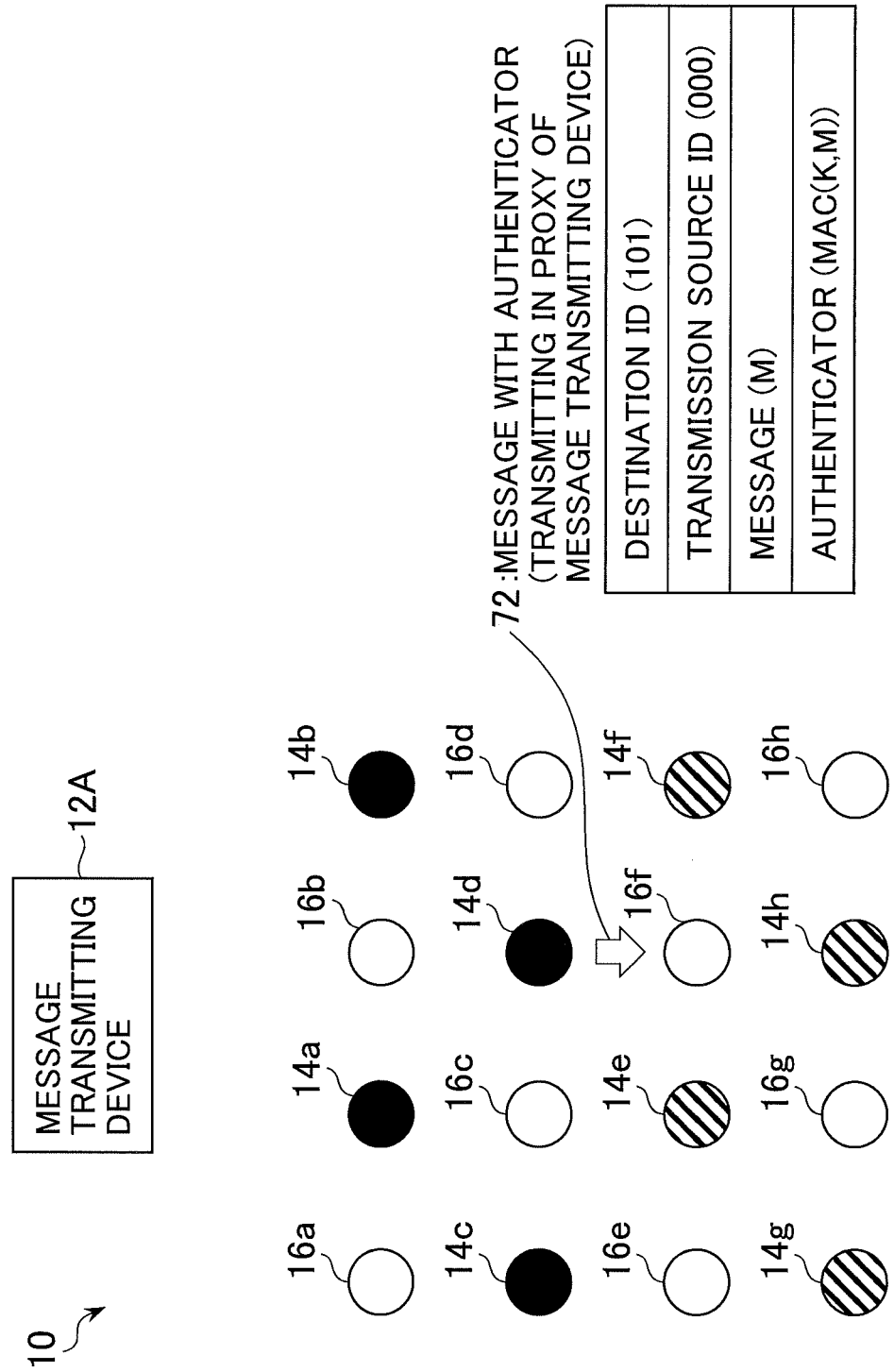

The fifth phase of operation is the process of transmitting a message with authenticator, as shown in FIG. 11. In the message receiving device 14d, the receiver 44A, FIG. 9B, receives data 56 and supplies the message authenticator 52A with the transmission request 86 included in the received data 56. The message authenticator 52A supplies the transmitter 54A with a message with authenticator 90 M∥MAC (K, M) supplied from the message transmitting device 12A and having already succeeded in authentication. The message receiving device 14d transmits the message with authenticator 90 as the data 70 through the transmitter 54A toward the message receiving devices 14e through 14h in the group G101.

Figure 12:
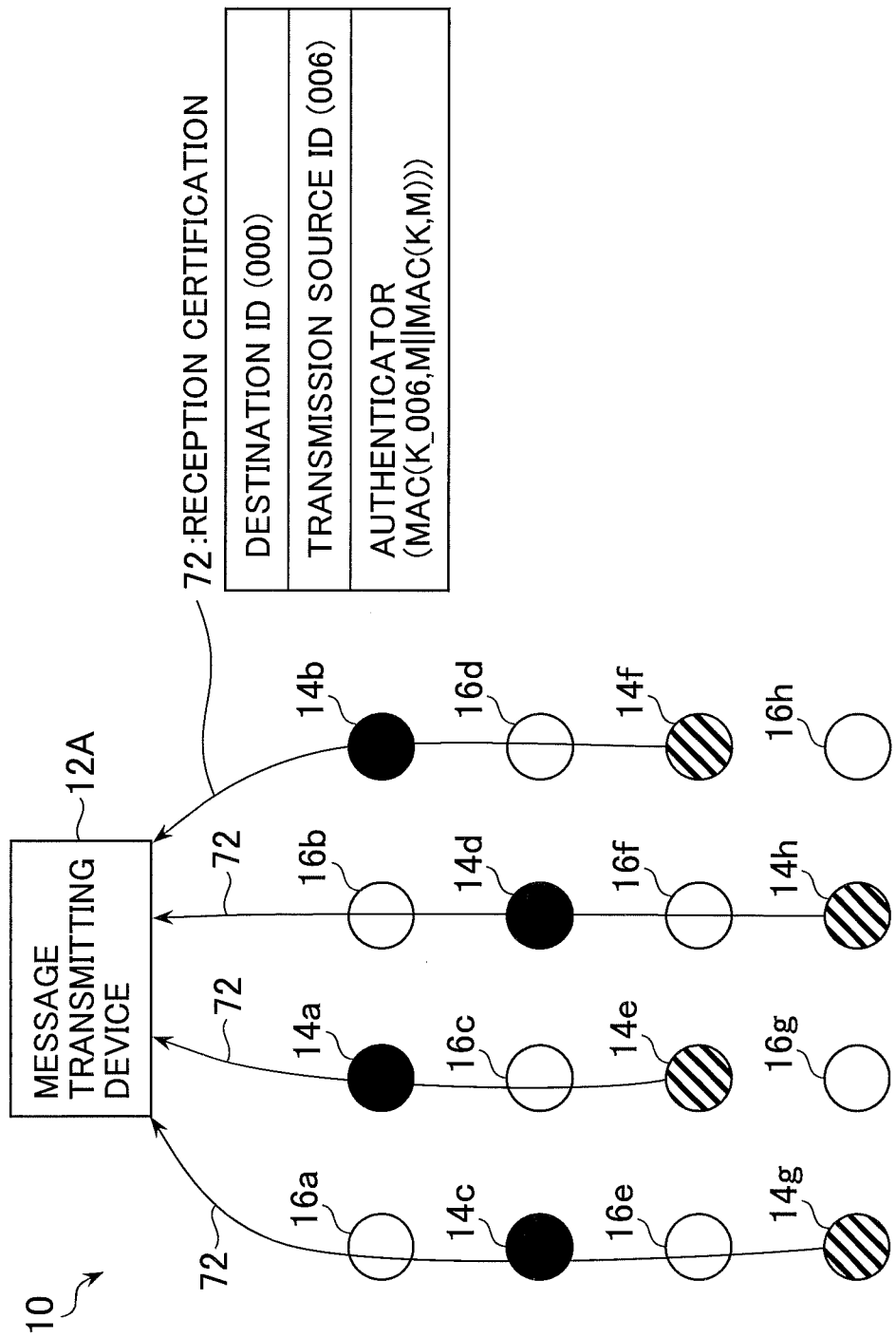

The sixth phase of operation is the process of transmitting a reception certification and checking a reception of the message, as shown in FIG. 12. In this process, similarly to the second phase of operation in the preceding embodiment, the message receiving devices 14e through 14h transmit the reception certification 70 as the data 72 toward the message transmitting device 12A, which will in turn check an arrival of the reception certification 70.

Figure 13:
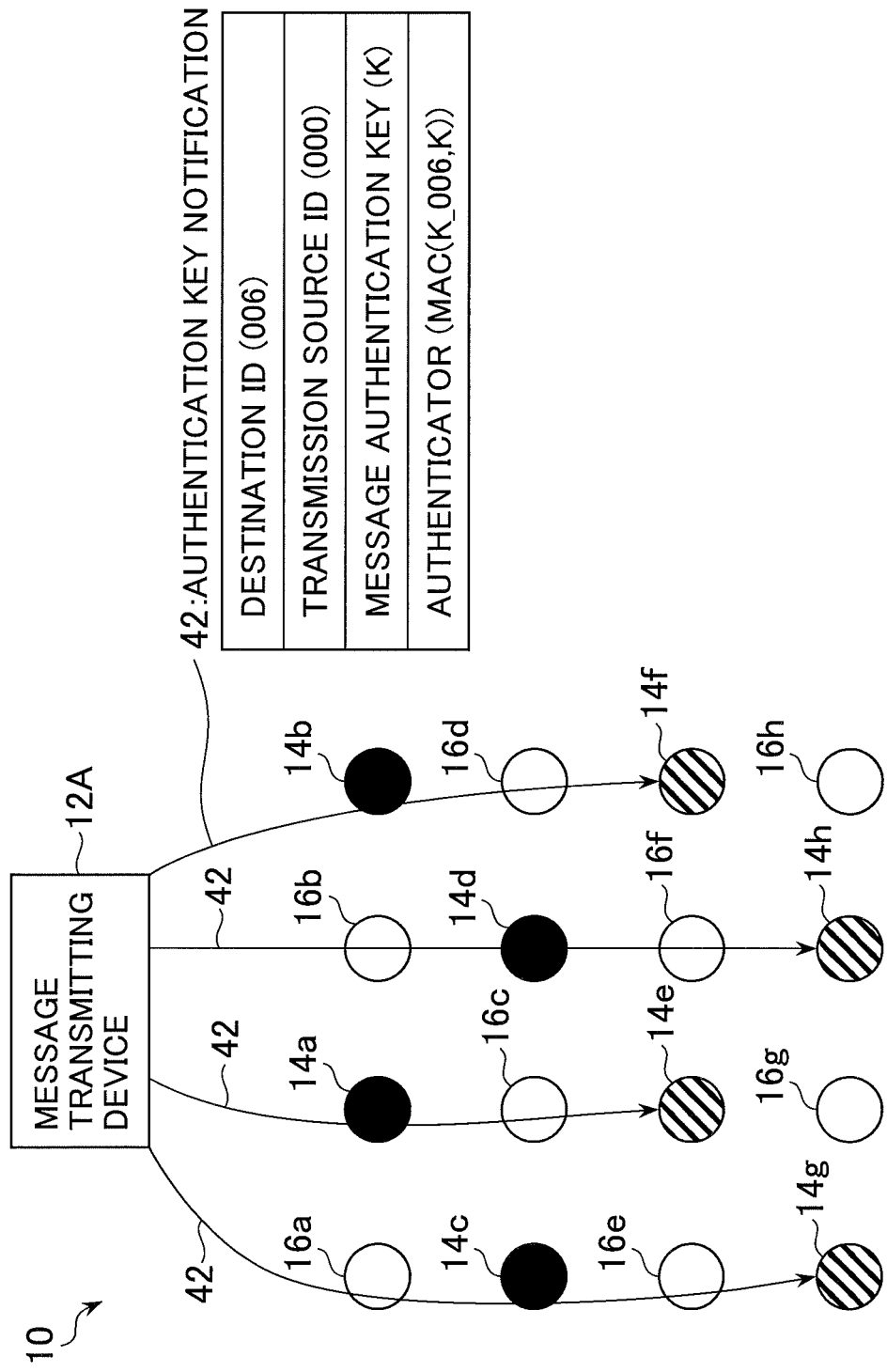
Figure 14:
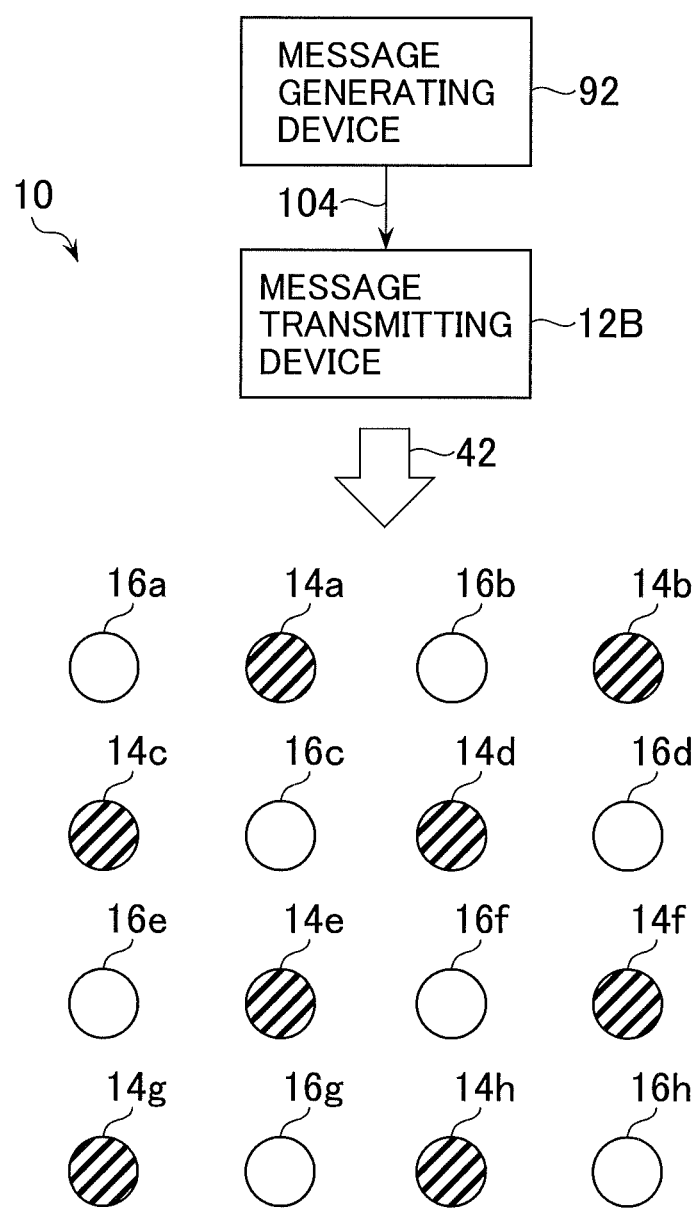
FIG. 14 schematically shows, like FIG. 1, the configuration of an alternative embodiment of a sensor network system to which a communication system in accordance with the present invention is applied.

The seventh phase of operation is the process of notifying a message authentication key and authenticating a message, as shown in FIG. 13. In this process, similarly to the third phase of operation in the preceding embodiment, the message transmitting device 12A transmits the authentication key notification as data 42 toward the message receiving devices 14e through 14h, which will in turn receive the data 42 as data 56 and accept the massage M included in the data 56 through authentication.

The message transmitting and receiving devices 12A and 14A operate in this way, so that, in the group of the message receiving devices 14a through 14h to which a message is to be destined, the message receiving devices 14a through 14d having accepted the message through authentication prior to the remaining message receiving devices 14e through 14h transmit the message toward those remaining message receiving devices in proxy of the message transmitting device 12A.

For example, in a multihop network, when an authenticated message is to be accepted by ones of the message receiving devices 14a through 14h which are given priority in the order of fewer hops thereto from the message transmitting device 12A, or when the message transmitting device 12A fails to confirm that a message with authenticator has arrived at any of the message receiving devices 14a through 14h, the message transmitting device 12A can rely upon the benefit of multihop communication to request neighboring message receiving devices, 14a through 14d in this example, which have already successfully confirmed the authentication of the message to transmit the message without re-transmitting the message by itself to the remote message receiving devices 14e through 14h.

In this alternative embodiment, the message transmitting device 12A request the message receiving devices 14a through 14d, having completed the authentication, to transmit the message in proxy of the message transmitting device 12A. However, this way of retransmission may not be restrictive. For example, the message receiving devices 14a through 14d may be requested from other message receiving devices, e.g. 14e through 14h, to transmit the message, and will transmit the message in response thereto.

Next, with reference to FIGS. 14 through 17, an alternative embodiment of the sensor network system 10 will be described in detail to which the communication system in accordance with the present invention is applied. The sensor network system 10 shown in FIG. 14 includes a message generating device 92 in addition to the message receiving devices 14a through 14h, and 16a through 16h, as well as a message transmitting device 12B in place of the message transmitting device 12 or 12A of the illustrative embodiments described earlier. The message receiving devices 14a through 14h may be implemented by message receiving devices 14B shown in FIG. 16B.

Figure 15:
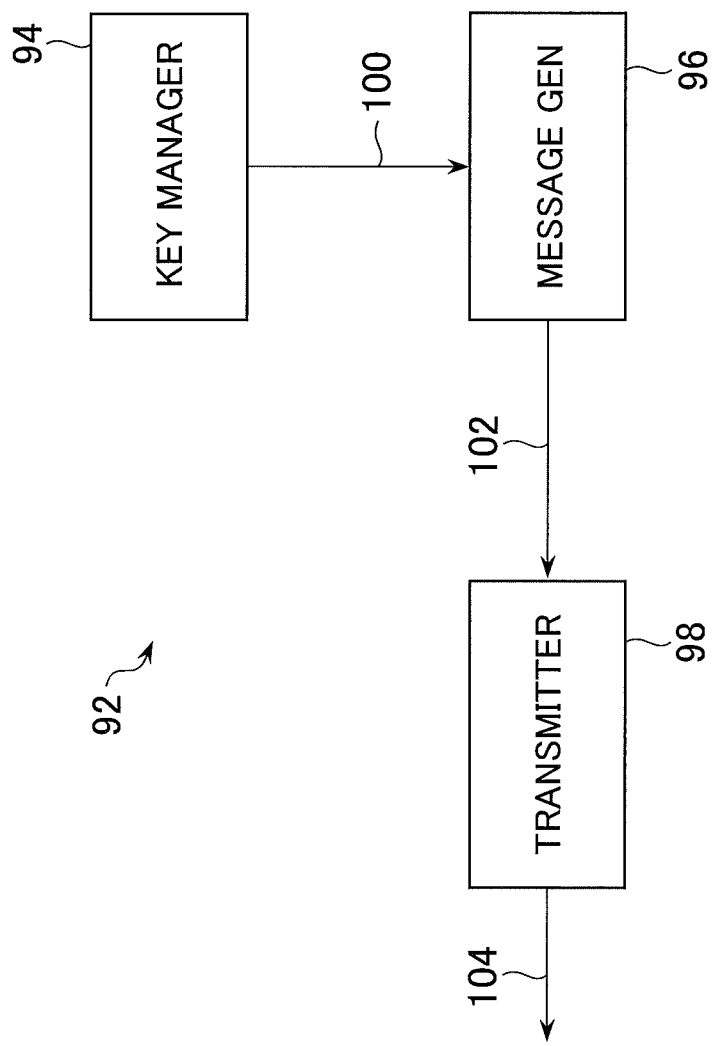
FIG. 15 is a schematic block diagram showing the configuration of a message generating device shown in FIG. 14.

In the sensor network system 10 of this alternative embodiment, before the message receiving devices 14a through 14h, not only the message transmitting device 12B authenticates a transmission source of messages but also the message generating device 92 authenticates a generation source of messages. The message generating device 92 includes, as shown in FIG. 15, a key manager 94, a message generator 96 and a transmitter 98 which are interconnected as depicted.

The message generating device 92 has a function to generate messages, and may be configured by including components and elements, such as a CPU, a ROM, a RAM, an EEPROM and a hard disk drive, for executing program sequences, as well as a unit having an interface function for communicating with other communication devices 14B. Those components, elements and/or unit may have, for example, programs for producing messages installed thereon. The message generating device 92 may not implemented by a single processor system but instead by plural processor systems so as to accomplish decentralized processing. In the latter case also, the message generating device 92 can be depicted as shown in FIG. 15 from a functional viewpoint.

Figure 16B:
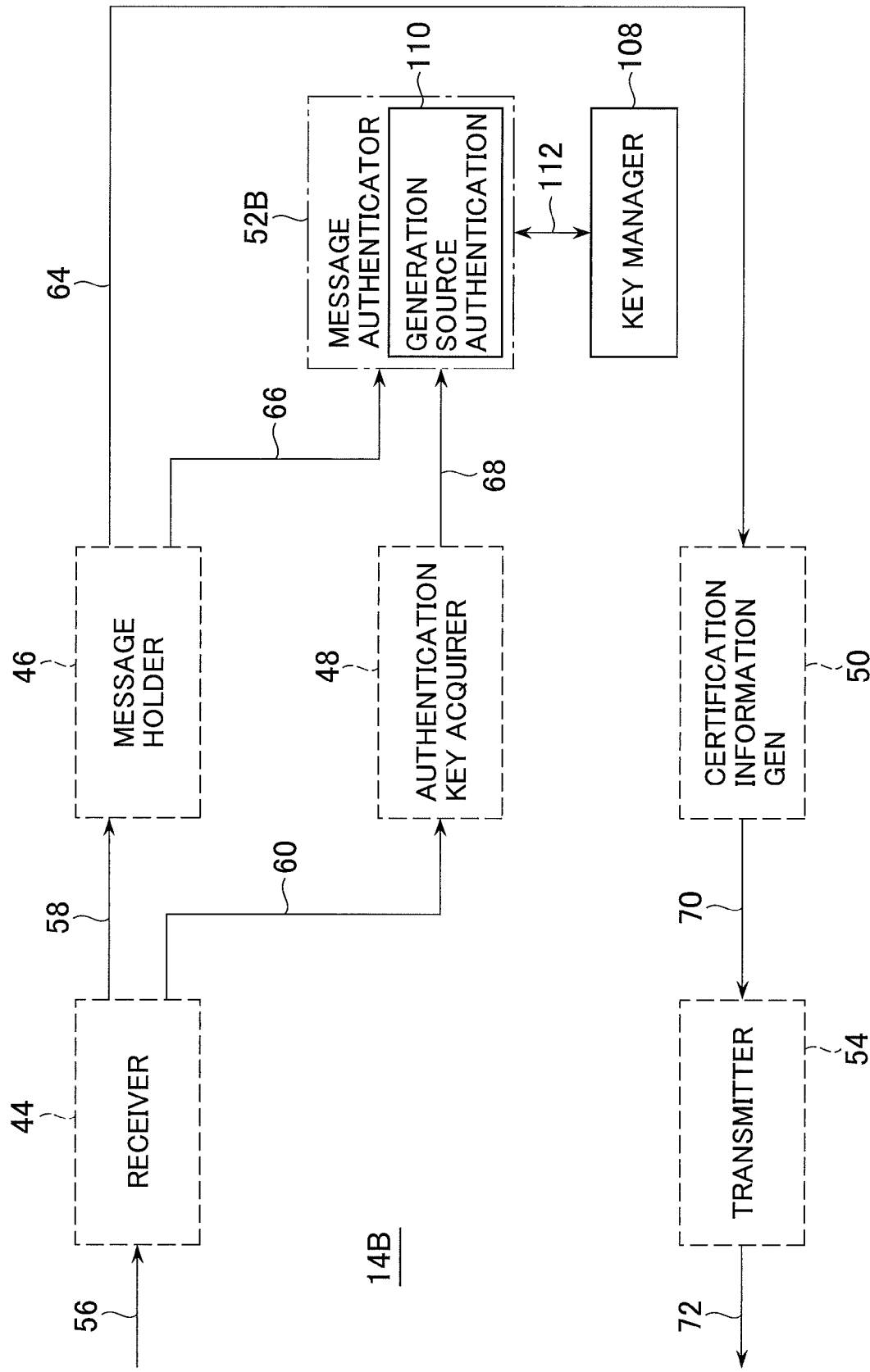
FIG. 16B is a schematic block diagram showing, like FIG. 2B, the functional configuration of a message receiving device shown in FIG. 14.

The key manager 94 has the function of managing a generation source certification key for use in certifying for the message receiving devices 14B, FIG. 16B, that the message generating device 94 acts as a generation source of messages. The key manager 94 delivers a managed generation source certification key 100 to the message generator 96.

The generation source certification key 100 may be, for example, a common key set in advance to be shared with the message receiving devices 14B by the message generating device 92, or may be shared by plural message receiving devices 14B, e.g. 14a through 14d, for which a message generated by the message generating device 92 is to be destined. For example, the generation source certification key 100 may be a common key which the manufacturer of the message receiving devices 14B has allocated in advance to the same model of message receiving devices 14B, having the same software update data in the form of message intended to be authenticated before the same model of message receiving devices 14B. The generation source certification key may be updated. For example, the key manager 94 may manage a random value Km and a chain of keys Ki, where $0 \le i \le m$ with a variable $m \ge 1$, which are formed by output values, Km−1, Km−2, ..., K1, and K0, resultant from applying a unidirectional function F to the value Km one or more times (F(Ki)= Ki−1), to use each key of the key chain as a generation source certification key.

The unidirectional function F(•) may be set as a known function in the system 10. In that case, as initial preparation, the message generating device 92 has a key K0 securely shared with the message receiving devices 14a through 14h, and uses keys of a key chain in the order opposite to the order in which the keys are generated, for example, in the order of K1, K2, K3, and so on, for generation source certification keys.

The message generator 96 is adapted to produce messages intended to be accepted through authentication by message receiving devices 14B. The message generator 96 may use a generation source certification key 100 supplied from the key manager 94 to generate an authenticator for a message. In this context, a message may be considered to have the generated authenticator added to a message originally intended to be transmitted. The messages may be encrypted. The message generator 96 develops the generated message 102 to the transmitter 98. When the generation source certification key 100 received from the key manager 94 is a key of the key chain, the message generator 96 may transfer the received generation source certification key 100 to the transmitter 98 together with the generated message.

The transmitter 98 carries a network interface function for enabling the message generating device 92 to communicate with another communication device 12B. A communication protocol for use in the transmitter 98 may not be restricted. The transmitter 98 is adapted to transmit a message 102 supplied from the message generator 96 as data 104 toward the message transmitting device 12B. When the transmitter 98 receives data 102 including a message and a generation source certification key from the message generator 96, it can transmit the received data 102 as a message 104 additionally including the generation source certification key toward the message transmitting device 12B.

With reference to FIG. 16A, the message transmitting device 12B may be the same as the illustrative embodiments shown in and described with reference to FIGS. 2A and 9A except for a receiver 18B and a message generator 24B. The receiver 18B has the same function as the receiver 18 shown in FIGS. 2A and 9A, namely, of receiving data 28 to output a reception certification 30 to the reception checker 20, and additionally the function of transferring, when the received data 28 are data 104 including a message 102 transmitted from the message generating device 92, the received message 102 to the message generator 24B as a message 106. When the receiver 18B receives a generation source certification key together with the message, it may include the received generation source certification key in the message 106 to transfer the resultant message to the message generator 24B. In FIGS. 16A and 16B also, the components and elements drawn with dashed line boxes may be the same as the illustrative embodiment shown in and described with reference to FIGS. 2A and 2B, and will not be described repetitively.

The message generator 24B may have the same function as the illustrative embodiment shown in FIG. 2B, and additionally be adapted for receiving the message 106 from the receiver 18B to generating an authenticator. Additionally, when the message generator 24B receives a generation source certification key from the receiver 18B, it may use the received generation source certification key as a message authentication key without originally generating a message authentication key.

Referring to FIG. 16B, the message receiving device 14B may be the same as the illustrative embodiment shown in FIG. 2B except for a message authenticator 52B having a different function and a newly added key manager 108. The message receiving device 14B is applicable to the message receiving devices 14a through 14h, which may be the same in structure, in the sensor network system 10 shown in FIG. 14. Possibly, that is also the case with the message receiving devices 16a through 16h.

The message authenticator 52B may have the same function as the illustrative embodiment shown in FIG. 2B except for further including a generation source authentication portion 110 for confirming the generation source of a message. The message authenticator 52B may be adapted such that, for example, when a message successful in authentication includes an authenticator separately generated by means of a generation source certification key, the authenticator 52B uses a generation source certification key 112 supplied from the key manager 108 to confirm the generation source of the message. Alternatively, the message authenticator 52B may be adapted such that, when the supplied message authentication key 68 and the supplied generation source certification key 112 are keys Ki of a key chain, where $0 \le i \le m$ with a variable $m \ge 1$, which are managed by the message generating device 92, the authenticator 52B verifies whether or not an output value obtained by applying a unidirectional function F with its input value set to a message authentication key is matched with the generation source certification key 112 supplied from the key manager 108. The message authenticator 52B may thereby confirm that the message authentication key is information authenticated by the message generating device 92 to use the confirmed message authentication key to accept the message. The message authenticator 52B may send the authenticated message authentication key as a new generation source certification key 112 to the key manager 108.

The key manager 108 has a function to manage a generation source certification key for use in authenticating that the generation source of a message is the message generating device 92. The generation source certification key may be, for example, a common key set in advance to be shared with the message generating device 92 by a message receiving device 14B. The key manager 110 may be adapted to be responsive to a new generation source certification key provided by the message authenticator 52B to update the generation source certification key it is managing. The key manager 108 sends the generation source certification key 112 to the message authenticator 52B.

Now, with reference to FIG. 17, the operation of the sensor network system 10 in accordance with the instant alternative embodiment will be described. Particularly, description will be focused on how the operation differs from the illustrative embodiment shown in FIG. 1.

The instant alternative embodiment may generally operate in four phases of operation, which includes an additional phase of operation newly inserted preceding the first, second and third phases of operation described earlier. The newly added phase of operation is the process of transmitting a message 104 to the message transmitting device 12B by the message generating device 92.

In the present alternative embodiment, as a generation source certification key, a key K_PRE may be used which is set in advance to be shared between the message generating device 92 and a message receiving devices 14B, i.e. each of the message receiving devices 14a through 14h, as will be referred to as a first case, or alternatively, keys Ki of a key chain may be used, as will be referred to as a second case.

In the first case, in the preceding phase of operation newly added, the message generator 96 produces data D intended to be accepted through authentication by the message receiving devices 14a through 14h, and uses a generation source certification key 100 K_PRE supplied from the key manager 94 to produce a message 102 "M", i.e. D∥MAC(K_PRE, D). The message generating device 92 transmits the data 104 including the message M through the transmitter 98 toward the message transmitting device 12B.

In the first phase of operation, the message with authenticator is transmitted. More specifically, the message transmitting device 12B supplies the message 106, M=D∥MAC (K_PRE, D), received by the receiver 18B to the message generator 24B. The first phase of operation following thereto in the system 10 will proceed as described on the illustrative embodiment shown in and described with reference to FIG. 4. In the second phase of operation, a reception certification is transmitted, and a reception of the message is checked. In the third phase of operation, a message authentication key is notified, and the message is accepted through authentication.

Then, the message authenticator 52B in each of the message receiving devices 14a through 14h verifies the authenticator included in the message M=D∥MAC (K_PRE, D) successful in authentication by means of the generation source certification key 118, K_PRE, supplied from the key manager 108. When the message receiving devices 14B succeeds in this verification, the generation source of the message M is confirmed to be the message generating device 92.

Next, in the second case, the operation will proceed as will be described. In the preceding phase of operation, a message is produced. Specifically, the key manager 94 of the message generating device 92 supplies the message generator 96 with an unused key K1 in a key chain 100 Ki.

The message generator 96 of the message generating device 92 then produces a message M intended to be accepted through authentication by the message receiving devices 14a through 14h to output the message M together with the generation source certification key 100, K1, supplied from the key manager 94 to the transmitter 98. In the message generating device 92, the transmitter 98 transmits the message M together with the generation source certification key 100 K1 as the data 104 to the message transmitting device 12B.

In the first phase of operation, the message with authenticator is transmitted. More specifically, in the message transmitting device 12B, the receiver 44A receives the data 56, and delivers the message 106 including the message M and the generation source certification key 100 K1 to the message generator 24B. The message generator 24B may utilize, in place of generating a message authentication key, the generation source certification key 100 K1 supplied from the receiver 18B as a message authentication key.

The first phase of operation following thereto in the system 10 will proceed as described on the illustrative embodiment shown in and described with reference to FIG. 4. Similarly, the second and third phases of operation will proceed. To put it simply, in the second phase of operation, a reception certification is transmitted, and a reception of the message is checked. In the third phase of operation, a message authentication key is notified, and the message is accepted through authentication.

Then, the message authenticator 52B in each of the message receiving devices 14a through 14h receives a generation source certification key 112 K0 from the key manager 108 and a message authentication key 68 K, i.e. the generation source certification key K1, from the authentication key acquirer 48. The message authenticator 52B in each of the message receiving devices 14a through 14h verifies whether or not an output value obtained by applying a unidirectional function F with its input value set to the generation source certification key K1 is matched with the generation source certification key K0.

The message authenticator 52B in each of the message receiving devices 14a through 14h verifies for a message 66 M included in a message with authenticator supplied from the message holder 46 whether or not the authenticator MAC(K, M) generated by means of the message authentication key successfully verified, i.e. the generation source certification key K1, is matched with an authenticator provided by the message holder 46 together with the message M. When the message authenticator 52B in a message receiving device 14B is successful in the matching, it accepts the message M as correct information transmitted by the message transmitting device 12B.

Additionally, if the message authenticator 52B in a message receiving device 14B has successfully verified the generation source certification key K1 at the same time, then the message M successful in authentication by means of the generation source certification key K1 is confirmed as genuine information generated by the message generating device 92.

In the key manager 108 in the message receiving device 143, a new generation source certification key K1 supplied from the message authenticator 52B is managed.

The sensor network system 10 in accordance with the present alternative embodiment includes the message generating device 92 for generating messages in addition to the message transmitting device 12B for transmitting messages, and thus the message receiving devices 14B confirm not only that the transmission source of messages is surely the message transmitting device 12B but also that the generation source of messages is surely the message generating device 92. It can therefore be confirmed that, for example, when the message generating device 92 is a software update data managing device of the manufacturer of the message receiving devices 14B to produce a message as software update data, the message receiving devices 14B can confirm not only that the received update data are surely transmitted from a wireless base station of the communication network joined by itself, i.e. the message transmitting device 12B, but also that the update data are correct data provided from the manufacturer of itself.

In the instant alternative embodiment thus described, when a key chain is used as a generation source certification key, an authenticator for a message is generated by the message transmitting device 12B. However, the present invention may not be restricted to the specific embodiment. The message generating device 92 may be adapted to generate an authenticator and transmit a message with authenticator to the message transmitting device 12B together with the generation source certification key.

In the instant alternative embodiment, the key manager 108 in the message receiving devices 14B has a key set in advance which is for use in authenticating a message as originally produced by the message generating device 92. However, the present invention may not be restricted to this specific embodiment. For example, such a key may be distributed and managed by the message receiving devices 14a through 14h after they join the sensor network system 10.

In the instant alternative embodiment, a key chain is used as a generation source certification key. However, the sensor network system 10 may be adapted such that the message transmitting device 12 or 12B in the two preceding embodiments manages a key chain, and the message receiving devices 14 or 14B manage keys generated by means of the key chain to use the keys of the key chain as message authentication keys.

In the present alternative embodiment, between the message generating device 92 and the message transmitting device 12B, a secure communication path may separately be configured.

The illustrative embodiments described above are directed to using a key K to generate an authenticator. However, that does not always mean using a key K without modification as the input value of a key to an authenticator generating function. For example, as a key to be inputted to an authenticator generating function, use may be made of an output value obtained from a predetermined function with a key K inputted in both an authenticator generating device and a verifying device.

The sensor network systems 10 in the above illustrative embodiments are telecommunications systems establishing wireless transmission between the communication devices. However, it is needless to say that some or all of the communication devices may be adapted to communicate through wired connection therebetween.

The entire disclosure of Japanese patent application No. 2010-228396 filed on Oct. 8, 2010, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A communication system, comprising: a first communication device for transmitting a message, and a second communication device for receiving the transmitted message and accepting the received message through authentication, wherein
said first communication device includes:
a first transmitter configured to transmit the message with an authenticator to said second communication device, and to subsequently transmit an authentication key notification corresponding to an identification of said second communication device to said second communication device;
a first receiver configured to receive from said second communication device a response to the transmitted message, and to extract from the received response a certification representing an arrival of the transmitted message at said second communication device; and
a non-transitory storage medium having program instructions stored thereon, execution of which by one or more processors of said first communication device causes said first communication device to provide functions of:
a message generator software component configured for generating a message authentication key for the message, for using the message authentication key to generate the authenticator for the message, and for sending the message with the authenticator to the first transmitter for transmitting the message with the authenticator to said second communication device;
a reception checker software component configured for, upon receiving the extracted certification from the first receiver, determining whether or not the extracted certification is included in the transmitted message with the authenticator, and for outputting an identification of said second communication device when a result from the determination is positive; and
an information generator software component configured for generating, in response to the identification, the authentication key notification using the identification and the message authentication key generated by the message generator for sending the message authentication key to said second communication device associated with the identification, and for sending the authentication key notification to the first transmitter to thereby allow said first transmitter to transmit the authentication key notification to said second communication device,
said second communication device includes:
a second receiver configured for receiving the message with the authenticator from said first communication device and for subsequently receiving the authentication key notification from said first communication device;
a second transmitter configured for, upon the second receiver receiving the message with the authenticator, transmitting to said first communication device the response to the received message; and
a non-transitory storage medium having program instructions stored thereon, execution of which by one or more processors of said second communication device causes said second communication device to provide functions of:
a message holder software component configured for, upon the second receiver receiving the message with the authenticator, holding the received authenticator;
a certification generator software component configured for receiving the held authenticator from the message holder, for generating the certification for said first communication device using the received authenticator, and for sending the certification to the second transmitter to transmit the certification via the response;
an authentication key acquirer software component configured for, upon the second receiver subsequently receiving the authentication key notification, extracting and acquiring the message authentication key from the authentication key notification; and
a message authenticator software component configured for using the acquired message authentication key to generate another authenticator, for comparing the generated authenticator with the held authenticator, and for accepting the message upon determining that the generated authenticator matches the held authenticator, to thereby confirm that the received message is received from said first communication device.

2. The system in accordance with claim 1, wherein the communication system further includes another second communication device, and said second transmitter has a function of forwarding the received authenticator to the another second communication device.

3. The system in accordance with claim 1, wherein
said first communication device owns key information shared with said second communication device,
said information generator of the first communication device uses the key information to generate the authentication key notification, and
said authentication key acquirer of the second communication device confirms the received authentication key notification via the key information, to thereby confirm that the authentication key notification is information uniquely specified by said first communication device.

4. The system in accordance with claim 1, wherein said message authenticator of the second communication device confirms the message authentication key only when an output value obtained by applying a unidirectional function to an input value set to equal the message authentication key acquired by said authentication key acquirer matches with a value held in advance.

5. The system in accordance with claim 1, further comprising:
a message generating device for generating the message to be transmitted by said first communication device, said message generating device including
a non-transitory storage medium having program instructions stored thereon, execution of which by one or more processors of said message generating device causes said message generating device to provide functions of another message generator for generating the message for transmission, and
a message transmitter for sending the generated message for transmission to said first communication device, such that said first receiver receives the message for transmission from said message generating device, and said message generator of the first communication device generates the authenticator for the received message for transmission.

6. The system in accordance with claim 5, wherein
said message generating device further comprises a first key manager for managing key information for certifying a generation source of the message for transmission,
said another message generator of the message generating device is configured to use the key information to generate another authenticator, and adding the generated authenticator to the generated message to thereby form the message for transmission,
said second communication device further includes a second key manager for managing the key information,
said message authenticator of the second communication device uses the key information managed by said second key manager to confirm whether or not the received message is from said message generating device.

7. The system in accordance with claim 6, wherein when an output value obtained by applying a unidirectional function to an input value set to equal the message authentication key acquired by said authentication key acquirer matches with the key information managed by said second key manager, said message authenticator confirms that the received message is from said message generating device.

8. A transmitter communication device on a message transmitter side for transmitting a message toward a receiver communication device, the receiver communication device being on a message receiver side for receiving the transmitted message and accepting the received message through authentication, comprising:

a transmitter configured to transmit the message with an authenticator to said receiver communication device, and to subsequently transmit an authentication key notification corresponding to an identification of said receiver communication device to said receiver communication device;
a receiver configured to receive from said receiver communication device a response to the transmitted message, and to extract from the received response a certification representing an arrival of the transmitted message at said receiver communication device; and
a non-transitory storage medium having program instructions stored thereon, execution of which by one or more processors of said transmitter communication device causes said transmitter communication device to provide functions of:
a message generator software component configured for generating a message authentication key for the message, for using the message authentication key to generate the authenticator for the message, and for sending the message with the authenticator to the transmitter for transmitting the message with the authenticator to said receiver communication device;
a reception checker software component configured for, upon receiving the extracted certification from the receiver, determining whether or not the extracted certification is included in the transmitted message, and for outputting an identification of said receiver communication device when a result from the determination is positive; and
an information generator software component configured for generating, in response to the identification, the authentication key notification using the identification and the message authentication key generated by the message generator for sending the message authentication key to said receiver communication device associated with the identification, and for sending the authentication key notification to the transmitter, to thereby allow said transmitter to transmit the authentication key notification to said receiver communication device.

9. The transmitter communication device in accordance with claim 8, wherein
said transmitter communication device owns key information shared with said receiver communication device, and
said information generator uses the key information to generate the authentication key notification.

10. A receiver communication device on a message receiver side for receiving a message transmitted from a transmitter communication device on a message transmitter side and for accepting the received message through authentication, comprising:
a receiver configured for receiving the message with an authenticator from said transmitter communication device, and for subsequently receiving an authentication key notification corresponding to an identification of said receiver communication device from said transmitter communication device;
a transmitter configured for, upon the receiver receiving the message with the authenticator, transmitting to said transmitter communication device a response to the received message; and
a non-transitory storage medium having program instructions stored thereon, execution of which by one or more processors of said receiver communication device causes said receiver communication device to provide functions of:

a message holder software component configured for, upon the receiver receiving the message with the authenticator, holding the received authenticator;

a certification generator software component configured for receiving the held authenticator from the message holder, for generating a certification for said transmitter communication device using the received authenticator, and for sending the certification to the transmitter to transmit the certification via the response;

an authentication key acquirer software component configured for, upon the second receiver subsequently receiving the authentication key notification, extracting and acquiring a message authentication key from the authentication key notification; and a message authenticator software component configured for using the acquired message authentication key to generate another authenticator, for comparing the generated authenticator with the held authenticator, and for accepting the message upon determining that the generated authenticator matches the held authenticator, to thereby confirm that the received message is received from said transmitter communication device.

11. The receiver communication device in accordance with claim 10, wherein said receiver communication device owns key information shared with said transmitter communication device, and when the received authentication key notification is confirmed by means of the key information, said authentication key acquirer confirms that the authentication key notification is information uniquely specified by and transmitted from said transmitter communication device.

12. A non-transitory computer-readable storage medium having a communication program stored thereon for causing a computer to act as a transmitter communication device on a message transmitter side for transmitting a message toward a receiver communication device, the receiver communication device being on a message receiver side for receiving the transmitted message and accepting the received message through authentication, wherein, when the communication program is installed in and run by the computer, said computer to provide functions of:

a transmitter configured to transmit the message with an authenticator to said receiver communication device, and to subsequently transmit an authentication key notification corresponding to an identification of said receiver communication device to said receiver communication device;

a message generator software component configured for generating a message authentication key for the message, for using the message authentication key to generate the authenticator for the message, and for sending the message with the authenticator to the transmitter for transmitting the message with the authenticator to said receiver communication device;

a receiver configured for receiving a response to the message with the authenticator from said receiver communication device, and extracting a certification representing an arrival of the transmitted message at said receiver communication device from the received response;

a reception checker software component configured for, upon receiving the extracted certification from the receiver, determining whether or not the extracted certification is included in the transmitted message, and for outputting an identification of said receiver communication device when a result from the determination is positive; and an information generator software component configured for generating, in response to the identification, the authentication key notification using the identification and the message authentication key generated by the message generator for sending the message authentication key to said receiver communication device associated with the identification, and for sending the authentication key notification to the transmitter, to thereby allow said transmitter to subsequently transmit the authentication key notification to said receiver communication device.

13. A non-transitory computer-readable storage medium having a communication program stored thereon for causing a computer to act as a receiver communication device on a message receiver side for receiving a message transmitted from a transmitter communication device on a message transmitter side and for accepting the received message through authentication, wherein, when the communication program is installed in and run by the computer, said computer to provide functions of:

a receiver configured for receiving the message with an authenticator from said transmitter communication device, and for subsequently receiving an authentication key notification corresponding to an identification of said receiver communication device from said transmitter communication device;

a message holder software component configured for, upon the receiver receiving the message with the authenticator, holding the received authenticator;

a certification generator software component configured for receiving the held authenticator from the message holder, for generating a certification for said transmitter communication device using the received authenticator, and for sending the certification to the transmitter;

a transmitter configured for transmitting to said transmitter communication device a response including the certification;

an authentication key acquirer software component configured for, upon the second receiver subsequently receiving the authentication key notification, extracting and acquiring a message authentication key from the authentication key notification; and a message authenticator software component configured for using the acquired message authentication key to generate another authenticator, for comparing the generated authenticator with the held authenticator, and for accepting the message upon determining that the generated authenticator matches the held authenticator, to thereby confirm that the received message is received from said transmitter communication device.

* * * * *